US010268433B2

United States Patent
Shibata

(10) Patent No.: US 10,268,433 B2
(45) Date of Patent: *Apr. 23, 2019

(54) DISPLAY SYSTEM

(71) Applicant: FANUC Corporation, Yamanashi (JP)

(72) Inventor: Yukio Shibata, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/133,222

(22) Filed: Apr. 20, 2016

(65) Prior Publication Data

US 2016/0306600 A1    Oct. 20, 2016

(30) Foreign Application Priority Data

Apr. 20, 2015    (JP) .................. 2015-085849

(51) Int. Cl.
| G02B 27/01 | (2006.01) |
| G06F 3/14 | (2006.01) |
| G06F 3/147 | (2006.01) |
| G06F 3/0488 | (2013.01) |
| G06F 3/0484 | (2013.01) |

(Continued)

(52) U.S. Cl.
CPC ....... G06F 3/1423 (2013.01); G02B 27/0172 (2013.01); G02B 27/0179 (2013.01); G06F 3/012 (2013.01); G06F 3/013 (2013.01); G06F 3/03547 (2013.01); G06F 3/0481 (2013.01); G06F 3/0488 (2013.01); G06F 3/04842 (2013.01); G06F 3/147 (2013.01); G09G 5/14 (2013.01); G02B 2027/014 (2013.01); G02B 2027/0132 (2013.01);
(Continued)

(58) Field of Classification Search
CPC .... G09G 5/14; G06F 3/14; G06F 3/01; G02B 27/0172; G02B 27/0179
See application file for complete search history.

(56) References Cited

U.S. PATENT DOCUMENTS

| 5,864,326 A | 1/1999 | Rallison | |
| 8,780,014 B2 * | 7/2014 | Border | G02B 27/017 |
| | | | 345/7 |

(Continued)

FOREIGN PATENT DOCUMENTS

| JP | 5-91582 A | 4/1993 |
| JP | 6-332412 A | 12/1994 |

(Continued)

OTHER PUBLICATIONS

Office Action in JP Application No. 2015-085849, dated Sep. 5, 2017, 13 pp.

(Continued)

Primary Examiner — Benyam Ketema
(74) Attorney, Agent, or Firm — Hauptman Ham, LLP

(57) ABSTRACT

Provided is a display system capable of displaying the contents of a larger number of windows. In this display, an operator wears a head-mounted display device on his/her head, a first display is on the front side, and the eyes of the operator is directed to the first display. With the head-mounted display device, the operator can see an enlarged image on the right side by a right-side display unit and can see an enlarged image on the left side by a left-side display unit.

15 Claims, 15 Drawing Sheets

(51) Int. Cl.
   *G06F 3/01*       (2006.01)
   *G09G 5/14*       (2006.01)
   *G06F 3/0481*     (2013.01)
   *G06F 3/0354*     (2013.01)

(52) U.S. Cl.
   CPC ........... *G02B 2027/0187* (2013.01); *G09G 2320/0261* (2013.01); *G09G 2360/04* (2013.01)

(56) References Cited

U.S. PATENT DOCUMENTS

| | | | |
|---|---|---|---|
| 9,081,177 B2* | 7/2015 | Wong | G02B 27/0093 |
| 2006/0080604 A1* | 4/2006 | Anderson | G06F 3/016 |
| | | | 715/701 |
| 2006/0250322 A1* | 11/2006 | Hall | G02B 27/0172 |
| | | | 345/8 |
| 2008/0005702 A1* | 1/2008 | Skourup | G06F 3/011 |
| | | | 715/848 |
| 2008/0158506 A1* | 7/2008 | Fuziak | G02B 27/0172 |
| | | | 351/158 |
| 2010/0007636 A1* | 1/2010 | Tomisawa | G03B 37/04 |
| | | | 345/204 |
| 2010/0060551 A1 | 3/2010 | Sugiyama et al. | |
| 2010/0245345 A1* | 9/2010 | Tomisawa | G02B 3/0062 |
| | | | 345/419 |
| 2011/0140994 A1* | 6/2011 | Noma | G02B 27/017 |
| | | | 345/8 |
| 2013/0013229 A1 | 1/2013 | Norieda et al. | |
| 2013/0077175 A1 | 3/2013 | Hotta et al. | |
| 2013/0088413 A1* | 4/2013 | Raffle | G02B 27/0101 |
| | | | 345/7 |
| 2013/0127980 A1 | 5/2013 | Haddick et al. | |
| 2014/0098102 A1* | 4/2014 | Raffle | G06F 3/0482 |
| | | | 345/440 |
| 2014/0285403 A1 | 9/2014 | Kobayashi | |
| 2015/0015479 A1* | 1/2015 | Cho | G06F 3/013 |
| | | | 345/156 |
| 2015/0084862 A1 | 3/2015 | Sugihara et al. | |
| 2015/0205106 A1* | 7/2015 | Norden | G02B 27/01 |
| | | | 345/7 |
| 2015/0317831 A1* | 11/2015 | Ebstyne | G06T 19/006 |
| | | | 345/419 |
| 2015/0348322 A1* | 12/2015 | Ligameri | G02B 27/017 |
| | | | 345/633 |
| 2015/0370072 A1* | 12/2015 | Lee | G02B 27/0172 |
| | | | 345/8 |

FOREIGN PATENT DOCUMENTS

| | | |
|---|---|---|
| JP | 9-197336 A | 7/1997 |
| JP | 9-508478 A | 8/1997 |
| JP | 10-111470 A | 4/1998 |
| JP | 10-334274 A | 12/1998 |
| JP | 2011-2660 A | 1/2011 |
| JP | 2012-162117 A | 8/2012 |
| JP | 2012-233962 A | 11/2012 |
| JP | 2013-73070 A | 4/2013 |
| JP | 5216761 B2 | 6/2013 |
| JP | 2013-255102 A | 12/2013 |
| JP | 2013-258614 A | 12/2013 |
| JP | 2014-56017 A | 3/2014 |
| JP | 2014-186089 A | 10/2014 |
| JP | 2015-504616 A | 2/2015 |
| JP | 5786854 B2 | 9/2015 |
| WO | 2009/044437 A1 | 4/2009 |

OTHER PUBLICATIONS

Notification of Reasons for Refusal in JP Application No. 2015-085849, dated Apr. 3, 2018, 10pp.

* cited by examiner

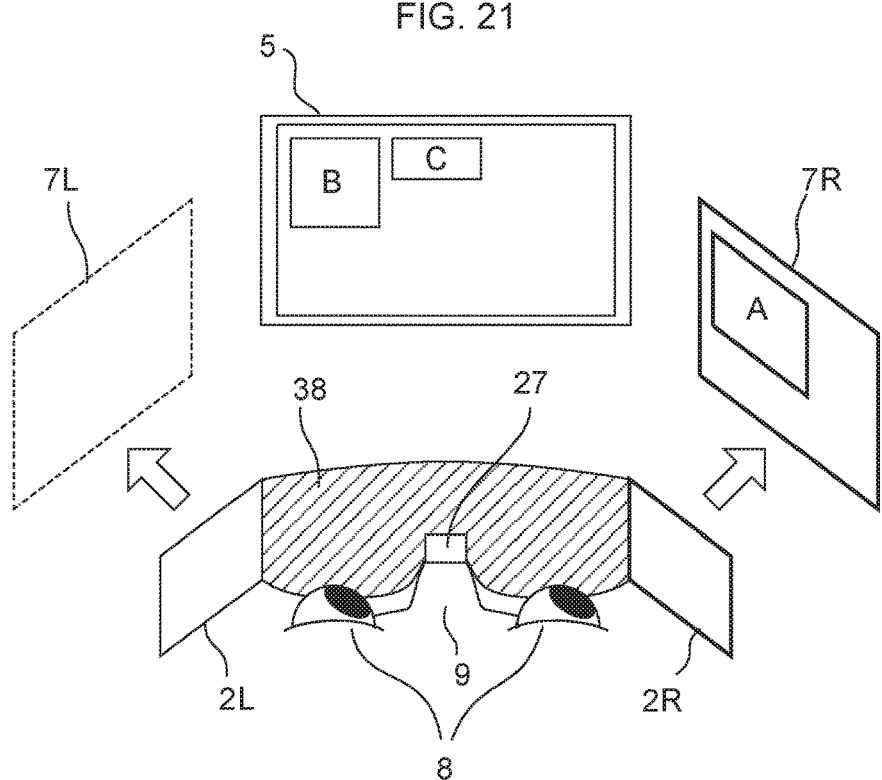
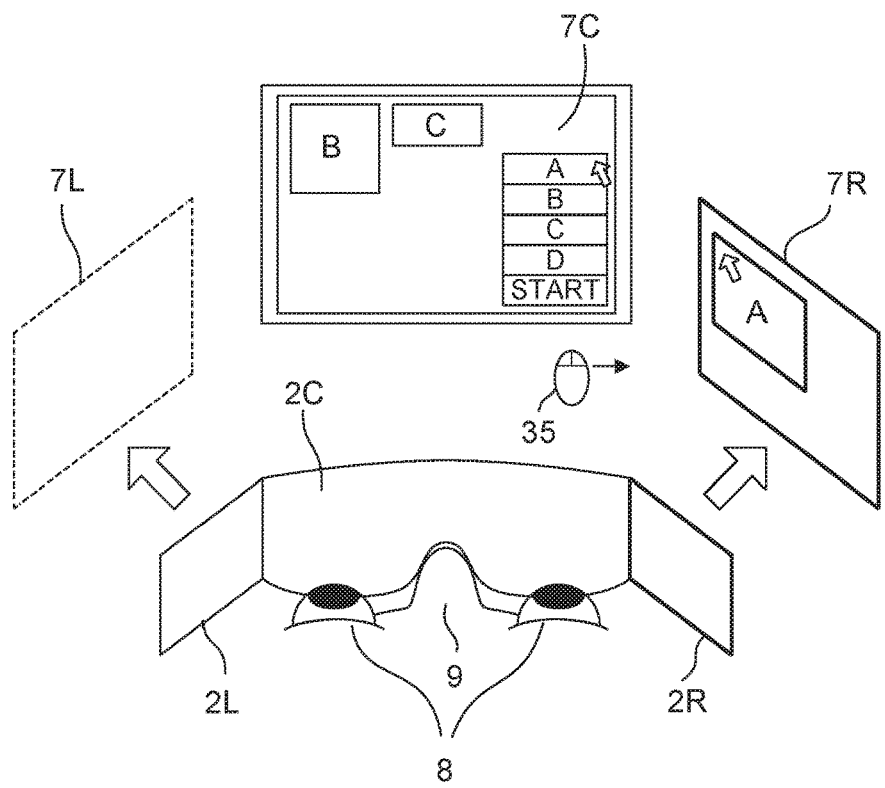

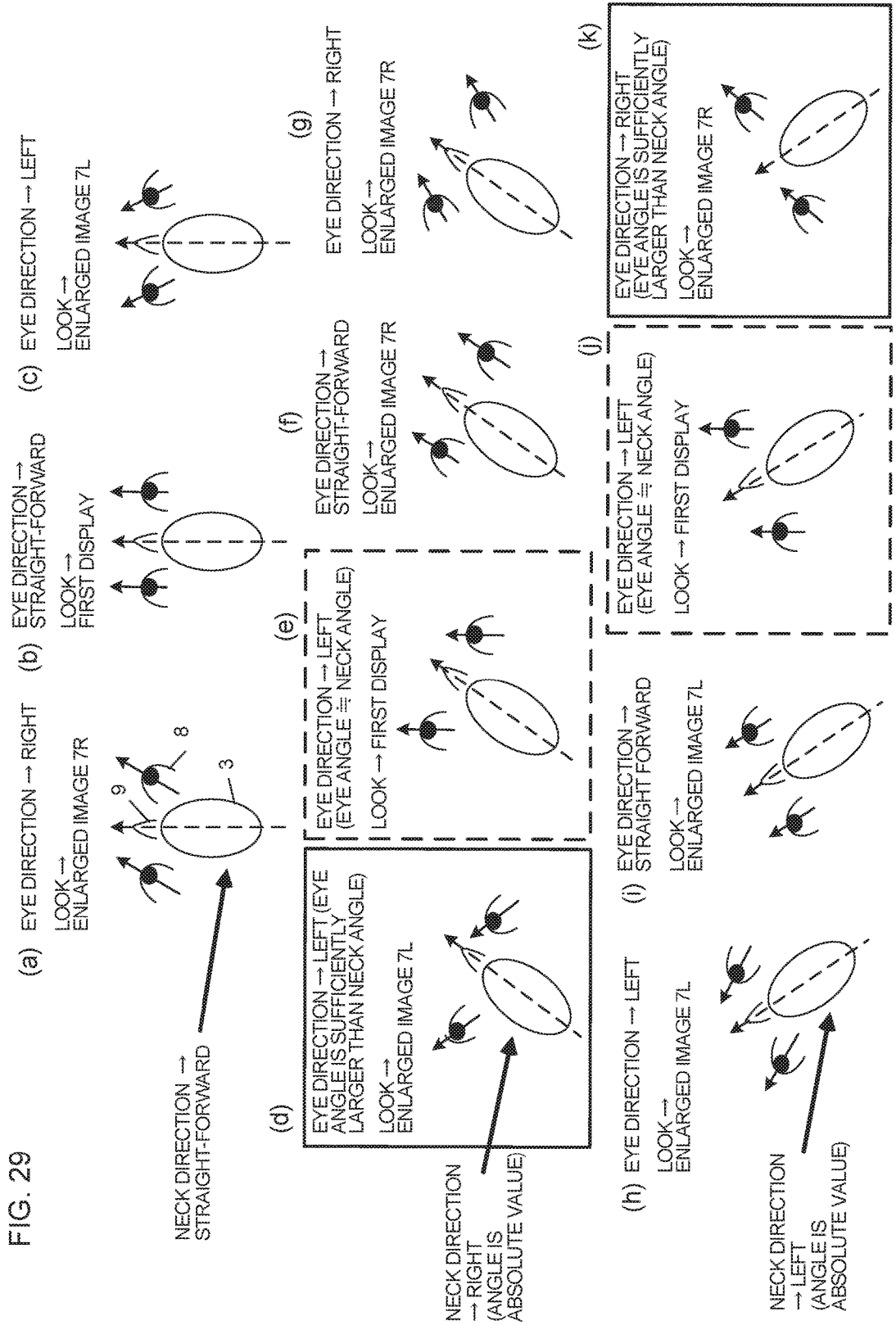

DISPLAY SYSTEM

RELATED APPLICATIONS

The present application claims priority to Japanese Patent Application Number 2015-085849, filed Apr. 20, 2015, the disclosure of which is hereby incorporated by reference herein in its entirety.

BACKGROUND OF THE INVENTION

1. Field of the Invention

The present invention relates to the field of displays in which a head-mounted display device is combined with a display such as a liquid crystal display device (LCD) provided in an electronic apparatus.

2. Description of the Related Art

Liquid crystal display devices (LCDs) are used to display various types of data in a numerical controller that controls machining tools. Displays which use LCDs are generally used. Moreover, the contents of a plurality of windows are displayed using one LCD. Further, in order to display the contents of a number of windows which cannot be displayed on one LCD, a plurality of LCDs is used to increase the number of contents displayed on the windows.

The window mentioned herein is a window displayed on a screen display of a numerical controller that controls machining tools. Examples of such a window include a system configuration window, a diagnosis window, a waveform diagnosis window, and an alarm window. Moreover, the window is a window displayed on a screen display of a personal computer (PC). Examples of such a window include a window displayed by spreadsheet software and a window displayed by document creating software.

Moreover, as one form of display devices, a head-mounted display device mounted on the head of a human body is known as disclosed in Japanese Patent Application Publication Nos. 2014-186089, 2013-73070, 2013-258614, 2013-255102 and H10-334274, Japanese Translation of PCT Application No. H9-508478, Japanese Patent Application Publication Nos. H9-197336 and H5-91582, and Japanese Patent No. 5216761.

When the contents of a plurality of windows are displayed, there is a limit on the number of contents displayed, and the size of a display becomes too large. Moreover, when a plurality of displays is used, the area in which these displays are placed increases. For example, in the case of machining tools in a factory, it is originally difficult to use a plurality of displays in a small machining tool and the costs may increase.

SUMMARY OF THE INVENTION

The present invention has been made in view of the problems of the conventional technique, and an object of the present invention is to provide a display system capable of displaying the contents of a larger number of windows.

A display system of the present invention is a display system which uses a first display provided in an electronic apparatus and a head-mounted display device including a second display, the display system including: a display destination selector that selects a display destination to determine whether a window is to be displayed on the first display or the second display; and a window selector that selects a window to be displayed on the display selected by the display destination selector, wherein the head-mounted display device is provided with the second display at a position such that the view of the first display is not blocked when an operator wears the head-mounted display device on his/her head and sees a window of the first display, and the window selected by the window selector is displayed on the display destination selected by the display destination selector.

The display destination selector may be a select key, and the display destination may be selected based on a touch position or a press position of the select key.

The display destination selector may be a select key, and the display destination may be selected based on the number of touches or presses on the select key.

The display destination selector may be a select key, and the display destination is selected based on a touching direction or a pressing direction of the select key.

The head-mounted display device may include an eye direction detector and a neck direction detector, and the display destination selector may be the eye direction detector and the neck direction detector.

The head-mounted display device may include an eye direction detector or a neck direction detector, and the display destination selector may be the eye direction detector or the neck direction detector.

The second display may be connected to a main body of the head-mounted display device by one or more hinges and is rotatable about a connection shaft of the hinge or the hinges, the eye direction detector and the neck direction detector may detect an eye direction and a neck direction, respectively, a combined direction of the eye direction and the neck direction is determined, when the combined direction is directed to the first display, the second display may be opened, and when the combined direction is directed to the second display, the second display may be closed.

The second display can be slid in a left-right direction, the eye direction detector and the neck direction detector may detect an eye direction and a neck direction, respectively, when a combined direction of the eye direction and the neck direction is directed to a right side, the second display may be slid to a left side, and when the combined direction of the eye direction and the neck direction is directed to a left side, the second display may be slid to a right side.

The eye direction detector and the neck direction detector may detect an eye direction and a neck direction, respectively, and the head-mounted display device may be provided with a substance which transmits light when a combined direction of the eye direction and the neck direction is directed to the first display and does not transmit light when the combined direction of the eye direction and the neck direction is directed to the second display.

A display system of the present invention is a display system which uses a head-mounted display device including a plurality of displays, the display system including: a display destination selector that selects a display destination to determine which one or more of the plurality of displays are to be used to display a window; and a window selector that selects a window to be displayed on the display selected by the display destination selector, wherein the window selected by the window selector is displayed on the display destination selected by the display destination selector.

A display system of the present invention is a display system, wherein a display region displayed in at least one of right-eye and left-eye displays of a head-mounted display device is divided into a plurality of regions, at least one of an eye direction and a neck direction is detected by at least one of an eye direction detector and a neck direction detector, when a combined direction of the detected eye direction and the detected neck direction is directed to a front side, a display region appearing on the front side is enlarged compared with remaining display regions, and display regions other than the display region appearing on the front side are reduced, and when the combined direction of the eye direction and the neck direction is directed in a direction other than the front side, a display region in the combined direction of the eye direction and the neck direction is enlarged and remaining regions including the display region appearing on the front side are reduced.

According to the present invention, it is possible to provide a display system capable of displaying the contents of a larger number of windows.

BRIEF DESCRIPTION OF THE DRAWINGS

The above and other objects and features of the present invention will be apparent from the following description of an embodiment with reference to the appended drawings, in which:

FIG. 21 is a diagram illustrating an example in which a voltage is applied to a transmissive LCD to darken the transmissive LCD so that an operator can easily see an enlarged image of the right side display unit or an enlarged image of the left side display unit of the head-mounted display device;

FIG. 22 is a diagram illustrating an example in which a device corresponding to the first display is provided in a head-mounted display device;

FIG. 29 is a diagram illustrating the relation between the directions of the eyes and the neck.

DETAILED DESCRIPTION OF THE PREFERRED EMBODIMENTS

Hereinafter, an embodiment of the present invention will be described together with the drawings.

Figure 1:
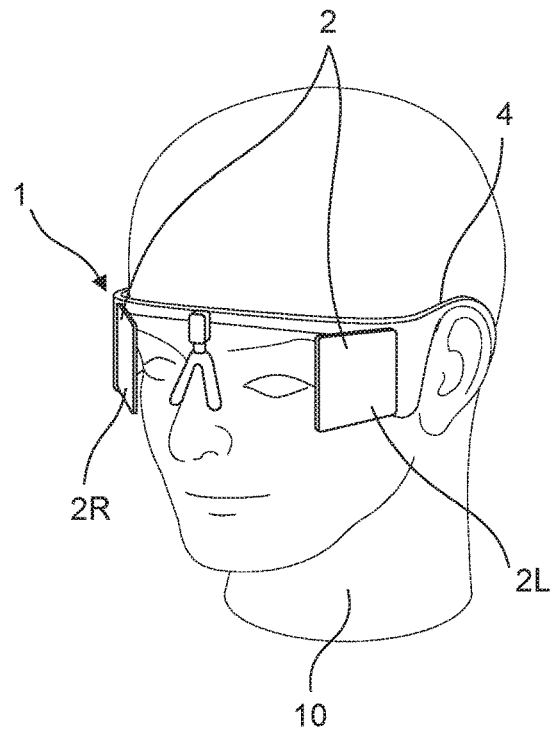
FIG. 1 is a diagram illustrating an example of a head-mounted display device.

FIG. 1 is a diagram illustrating an example of a head-mounted display device 1. FIG. 1 illustrates a state in which the head-mounted display device 1 is mounted on the head of an operator 10. The size, the thickness, and the like of the components illustrated in FIG. 1 are depicted conceptually and schematically and are not the same as those of the actual components, and a number of head-mounted display devices 1 that can realize the present invention may be present.

A display (hereinafter referred to as a "second display") of the head-mounted display device 1 is not provided in the central part of head-mounted display device 1 to be able to watch a display (hereinafter referred to as a "first display") provided in an electronic apparatus such as a controller that controls machining tools. The first display is not illustrated in FIG. 1. In this example, the display units 2R and 2L of the second display (hereinafter referred to as "display unit 2R" and "display unit 2L") of the head-mounted display device 1 are provided so that the second display 2 is disposed on the left and right sides of the eyes of the operator so as not to block the view of the first display 5 (see FIG. 2). In FIG. 1, the second display includes the right-eye display unit 2R and the left-eye display unit 2L. The usability of the second display is improved when the second display can be moved to a position at which the operator can see windows of the second display.

Although a power source that drives the head-mounted display device 1 is not illustrated, the power source may be a battery and power may be supplied via a cable from the first display or the other source. A controller (which may be a PC including a computer, may be a dedicated device including a computer, or may be a dedicated device that does not include a computer) that processes windows or the like may be provided integrally with the first display and may be provided in another place independently from the first display. Information on windows or the like displayed on the head-mounted display device 1 may be transmitted from an integrated or independent controller wirelessly or via a cable. The information from the head-mounted display device 1 may be transmitted wirelessly or via a cable.

In the above description, although a window selector or the like is displayed on the first display, the window selector or the like may be displayed on the second display. In this case, the controller may be provided in the head-mounted display device 1. The controller provided in the head-mounted display device 1 may have the same configuration as that disclosed in Japanese Patent Application Publication Nos. 2014-186089 and 2013-255102. Since such a controller is well known, the description thereof will not be provided. When the size of the controller can be reduced, the head-mounted display device 1 and the controller are preferably integrated rather than being separated.

Figure 2:
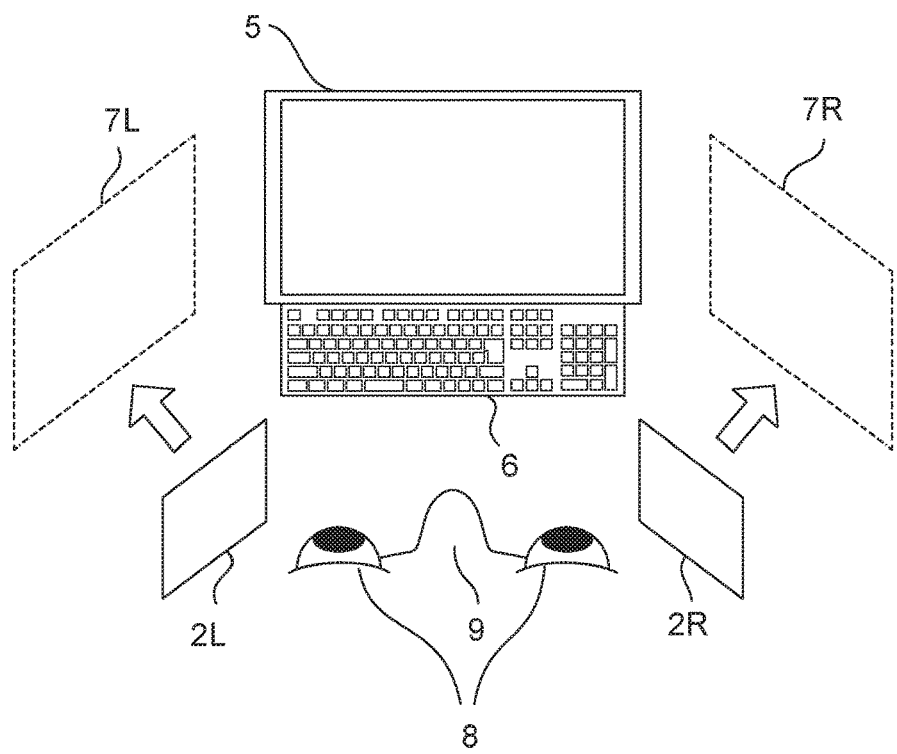
FIG. 2 is a diagram illustrating a display system including a first display and a second display.

FIG. 2 is a diagram illustrating a display system including the first and second displays. Similarly to FIG. 1, the size, and the thickness, and the like of components in FIG. 2 are depicted conceptually and schematically. The operator having the head-mounted display device 1 mounted on his/her head is situated in a state in which the first display 5 is on his/her front side and the operator confronts the first display 5.

Only the eyes 8 and the nose 9 of the operator 10 are illustrated. Moreover, only the display units 2R and 2L of the head-mounted display device 1 are illustrated. An enlarged image that the operator 10 sees on the display unit 2R is indicated by an enlarged image 7R, and an enlarged image that the operator 10 sees on the display unit 2L is indicated by an enlarged image 7L. A hardware keyboard 6 is illustrated as an example of an input device. With regard to a system for viewing an enlarged image, a number of inventions have been filed in addition to Japanese Patent Application Publication No. 2013-73070, Japanese Translation of PCT Application No. H9-508478, Japanese Patent Application Publication Nos. H9-197336 and H5-91582. Since such inventions are well known, the description thereof will not be provided.

A manual data input (MDI), a software keyboard, or the like other than the hardware keyboard 6 may be used as an input device. As the input device, a voice recognition system, an image recognition system (for example, a system in which buttons such as select keys are displayed on a board, the position of a button, the character, and the number indicated by an operator are recognized as images, or a system in which the character, the number, and the like that an operator draws with his/her finger, a pointer, or the like are recognized as images), an arm (body) tap input system (for example, Japanese Patent Application No. 2012-505658 (Japanese Patent No. 5786854)), and other system can be used.

Figure 3:
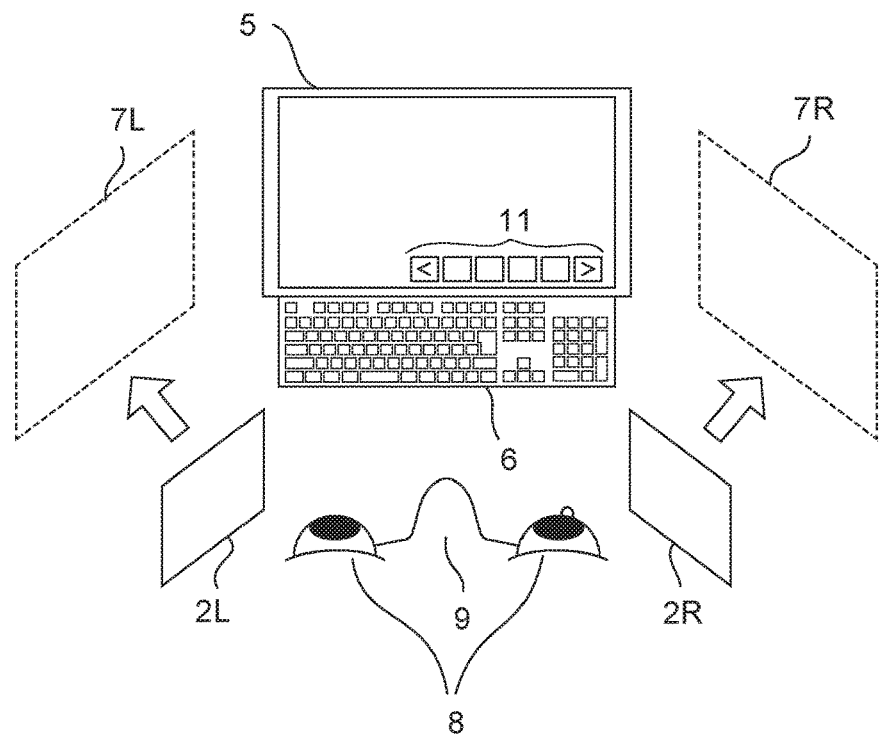
FIG. 3 is a diagram illustrating the display system illustrated in FIG. 2, in which a key is displayed on the first display and used.

Another input device may be added in addition to the input device of the configuration example. FIG. 3 illustrates an example in which a key is displayed on a display portion of the first display 5 as an input device used in addition to the hardware keyboard 6 which is the input device of the configuration example illustrated in FIG. 2, and the key 11 on the display portion of the first display 5 is selected using the key of the hardware keyboard 6. When the first display 5 has a touch panel attached thereto, the operator can select a key on the display portion of the first display 5 by touching or pressing on the key.

Figure 4:
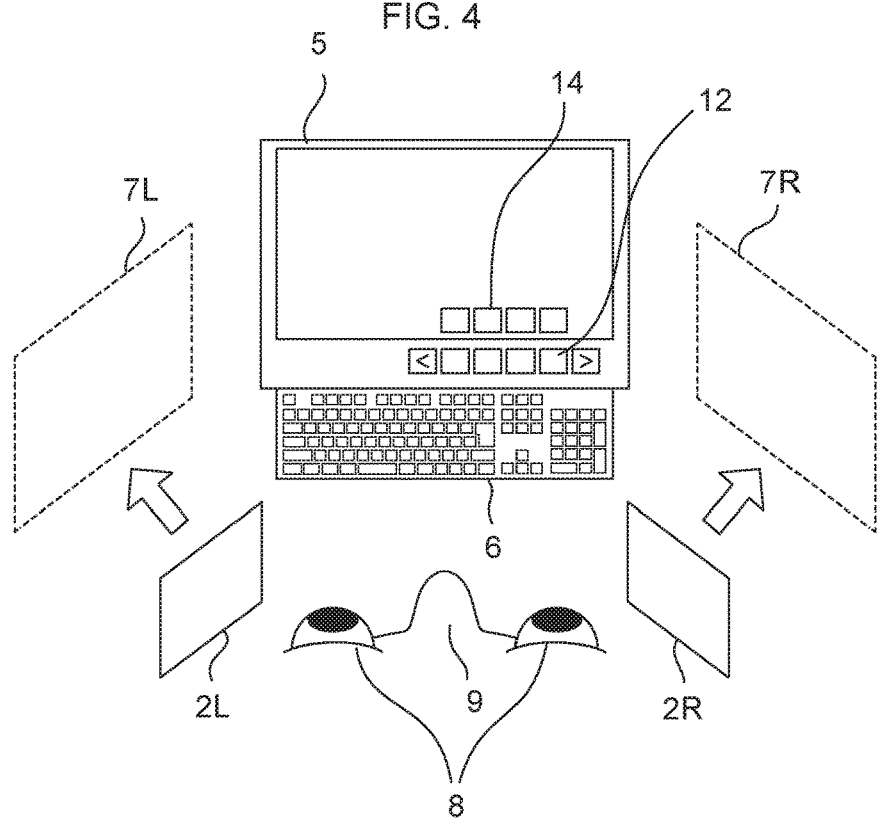
FIG. 4 is a diagram illustrating the display system illustrated in FIG. 2, in which a key is provided outside a display portion of the first display.

FIG. 4 illustrates a configuration in which a key 12 is provided outside the display portion of the first display 5 as an input device used in addition to the hardware keyboard 6 which is the input device of the configuration example illustrated in FIG. 2. FIG. 4 illustrates an example in which the content of the key is displayed on a window selection indicator 14 on the display portion of the first display 5, and a selection is carried out when the operator presses on the key 12 outside the display portion of the first display 5. A window may be selected based on the content of a key in the window selection indicator 14 on the display portion of the first display 5 using the keys of the hardware keyboard 6.

Moreover, a mouse may be used as an additionally added input device. Since the usage of the mouse is well known, the description thereof will not be provided. Naturally, the operator may select keys using the mouse in FIGS. 3 and 4.

Further, a touchpad may be used as another additionally added input device. The touchpad may be placed on the display portion of the first display 5 (in this case, the touchpad is a software touchpad and is often attached to a touch panel). The touchpad may be placed outside the display portion of the first display 5 (in this case, the touchpad is a hardware touchpad). The touchpad may be placed on the hardware keyboard or the MDI. Since the usage of the touchpad is well known, the description thereof will not be provided. Naturally, the operator may select keys using the touchpad in FIGS. 3 and 4.

Example 1

Figure 5:
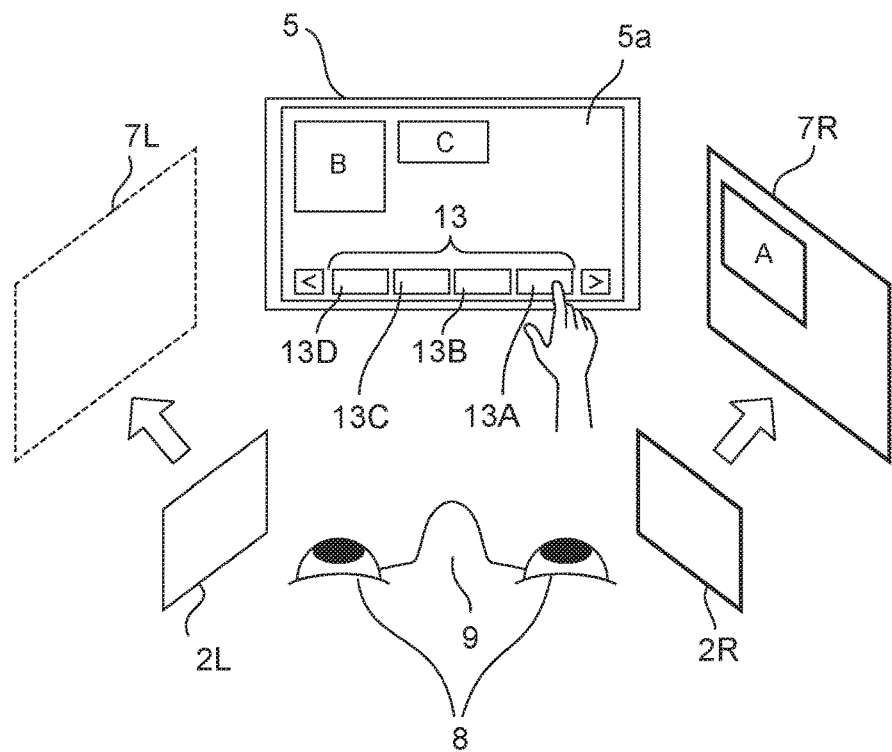
FIG. 5 is a diagram illustrating an example in which an operator touches or presses on the right side of a window select key to display an A-window on an enlarged image of the right side display unit.

FIG. 5 illustrates a state in which the operator sees the first display 5 in a state of having the head-mounted display device 1 mounted on his/her head. Only the display units 2R and 2L which are the second display 2 of the head-mounted display device 1 are illustrated. It is assumed that a B-window and a C-window are already displayed on the first display 5. The input devices such as a hardware keyboard, a MDI, and a software keyboard are not illustrated for better understanding of the drawings (hereinafter, the same is true for the same components).

In this example, the first display 5 is a display having a touch panel 5a attached thereto. In this example, an A-window select key 13A to a D-window select key 13D are displayed as a window selector 13 under the display portion of the first display 5 using the features of the touch panel. Further, when the operator touches or pressed on ">" to select an E-window select key 13E and the subsequent keys, window select keys for an E-window and the subsequent windows are displayed. It is assumed that when the operator touches or presses on "<", an original state is restored. It is arbitrary whether the original state is the previous state or the initial state (the same is true for the function of the keys ">" and "<").

FIG. 5 illustrates an example in which, when the operator selects the A-window using the A-window select key 13A of the window selector 13, the operator can see an enlarged image of the A-window on an enlarged image 7R by touching or pressing on the right side of the key (hereinafter, an "example in which an enlarged image of a window can be seen" will be referred to as an "example in which a window is displayed").

It is assumed that the head-mounted display device 1 can be adjusted so that the enlarged image 7R is seen on the right side of the first display 5. In this display method, the A-window is displayed on the first display 5 when the operator touches or pressed on the center of the key and is displayed on the enlarged image 7L when the operator touches or presses on the left side of the key. It is assumed that the head-mounted display device 1 can be adjusted so that the enlarged image 7L is seen on the left side of the first display 5.

Figure 6:
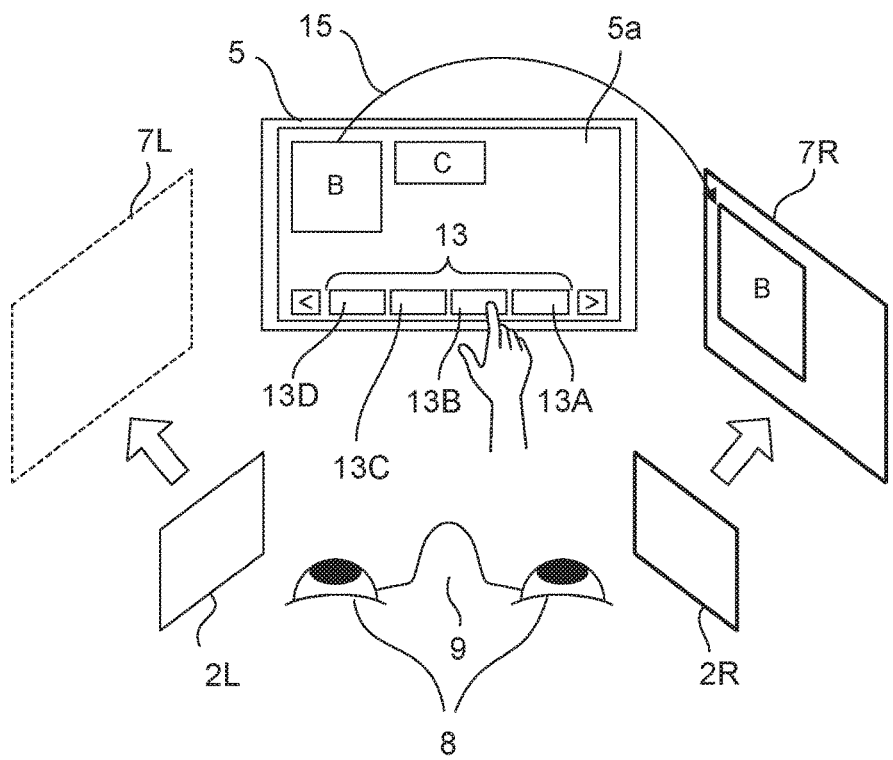
FIG. 6 is a diagram illustrating an example in which an operator moves a B-window of the first display to an enlarged image of the right side display unit.

FIG. 6 is a diagram illustrating an example in which the B-window in the first display 5 is moved to the enlarged image 7R. The window selector 13 includes the A-window select key 13A, the B-window select key 13B, the C-window select key 13C, and the D-window select key 13D. In this example, the B-window is displayed on the enlarged image 7R when the operator touches or presses on the right side of the B-window select key 13B. When the operator presses on the right side of the B-window select key 13B, the B-window is moved from the first display 5 and is displayed on the enlarged image 7R (see mark 15). The window select keys of the window selector 13 may be divided to be used for the enlarged image 7R, the first display 5, and the enlarged image 7L.

Example 2

Figure 7:
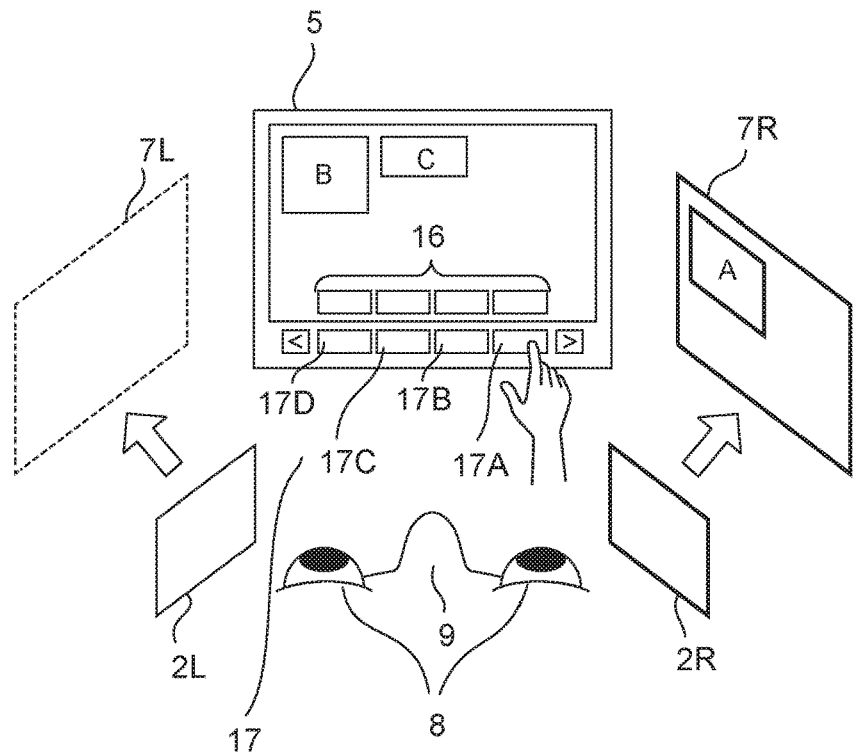
FIG. 7 is a diagram illustrating an example in which a window select key is provided outside a display portion of the first display, a window selection indicator is provided on the display portion of the first display, and an operator touches or presses on the right side of the window select key to display the A-window on the enlarged image of the right side display unit.

FIG. 7 is a diagram illustrating an example in which a window select key (window selector 17) is provided outside the display portion of the first display 5, and a window selection indicator 16 is provided on the display portion of the first display 5 to display the content of the window select key on the window selection indicator 16. In this example, a window is selected when the operator presses on the window select key outside the display portion of the first display 5. The window selector 17 includes an A-window select key 17A, a B-window select key 17B, a C-window select key 17C, and a D-window select key 17D.

In this example, the key (the key of the window selector 17) outside the display portion of the first display 5 is a three-contact key, and the A-window is displayed on the enlarged image 7R when the operator presses on the right side of the A-window select key 17A. In this display method, the A-window is displayed on the first display 5 when the operator presses on the center of the A-window select key 17A and is displayed on the enlarged image 7L when the operator presses on the left side of the A-window select key 17A. The window select keys may be divided to be used for the enlarged image 7R, the first display 5, and the enlarged image 7L.

Example 3

Figure 8:
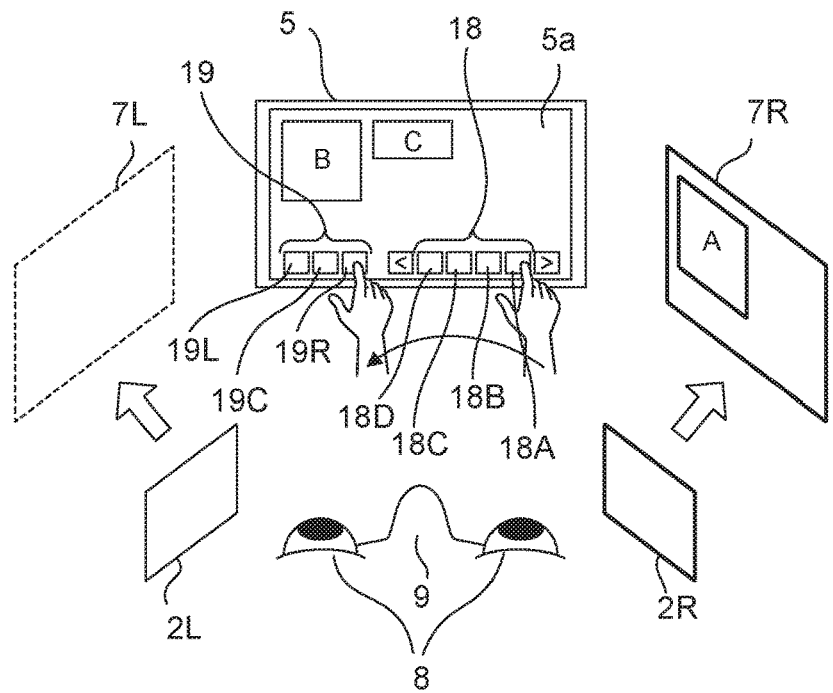
FIG. 8 is a diagram illustrating an example in which an operator touches or presses on an A-window select key and an R-select key to display the A-window on an enlarged image of the right side display unit.

FIG. 8 is a diagram illustrating an example in which the first display 5 is a display having a touch panel attached thereto. In this example, an A-window select key 18A to a D-window select key 18D are displayed as a window selector 18 under the display portion of the first display 5 using the features of the touch panel. A display destination selector includes RCL-select keys 19R, 19C, and 19L. When the operator touches or presses on the R-select key 19R, the enlarged image 7R is selected as a display destination of the selected window. When the operator touches or presses on the C-select key 19C, the first display 5 is selected as a display destination of the selected window. When the operator touches or presses on the L-select key 19L, the enlarged image 7L is selected as a display destination of the selected window. In this example, the A-window is displayed on the enlarged image 7R when the operator touches or presses on the A-window select key 18A and then touches or presses on the R-select key 19R. In this example, although the operator touches or presses on the key of the window selector 18 and then touches or presses on the key of the display destination selector 19, the operator may touch or press on the key of the display destination selector 19 and then touch or press on the key of the window selector 18.

Example 4

Figure 9:
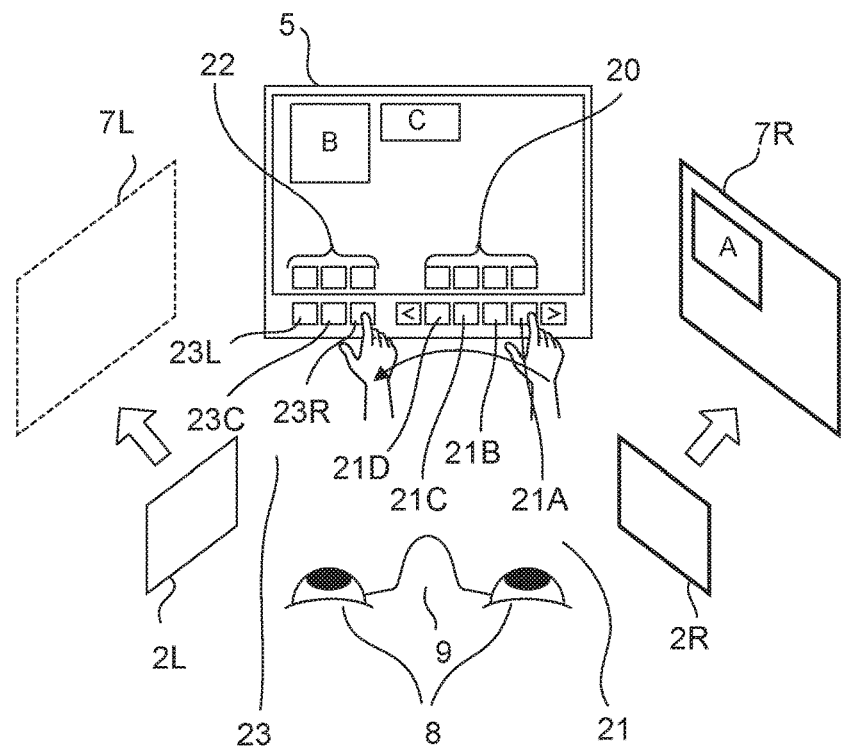
FIG. 9 is a diagram illustrating an example in which a window select key and a display destination select key are provided outside the display portion of the first display, and an operator touches or presses the A-window select key and the R-select key to display the A-window on an enlarged image of the right side display unit.

FIG. 9 is a diagram illustrating an example in which a window select key (window selector 21) is provided outside the display portion of the first display 5, a window selection indicator 20 is provided on the display portion of the first display 5 so that the content of the window select key (the window selector 21) is displayed on the window selection indicator 20, an RCL-select key (display destination selector 23) is provided outside the display portion of the first display 5, and a display destination selection indicator 22 is provided on the display portion of the first display 5 so that the content of the RCL-select keys 23R, 23C, and 23L is displayed in the display destination selection indicator 22.

In this example, a window is selected when the operator presses on the window select key (the window selector 21) outside the display portion of the first display 5 and a display destination is selected when the operator presses on the RCL-select key (the display destination selector 23). FIG. 9 illustrates an example in which the A-window is displayed on the enlarged image 7R when the operator presses on the A-window select key 21A and then presses on the R-select key 23R. In this example, although the operator presses on the window select key (the window selector 21) and then presses on the RCL-select key (the display destination selector 23), the operator may press on the RCL-select key (the display destination selector 23) and then press on the window select key (the window selector 21).

Example 5

Figure 10:
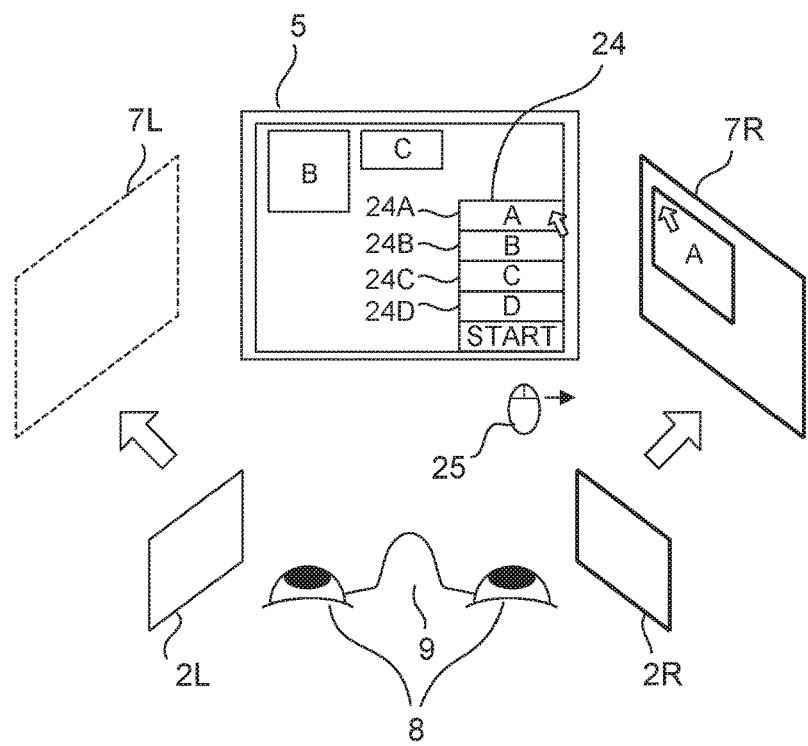
FIG. 10 is a diagram illustrating an example in which an operator displays the A-window on an enlarged image of the right side display unit using a mouse.

FIG. 10 illustrates an example in which a mouse 25 is used. When the operator clicks on START, a window selector 24 is displayed on the screen display of the first display 5. In this example, an A-window 24A is selected among the A-window 24A to the D-window 24D using the mouse 25, and the A-window is displayed on the enlarged image 7R by drag-and-drop. In this case, the mouse 25 functions as a display destination selector. The window selector 24 may be provided on the first display 5, the A-window may be selected using the mouse, and the A-window may be displayed on the enlarged image 7R by drag-and-drop. When an E-window and the subsequent windows are present, although such a window may be displayed further, since a display method thereof is well known, the description thereof will not be provided. A touchpad may be used instead of the mouse.

Example 6

Figure 11:
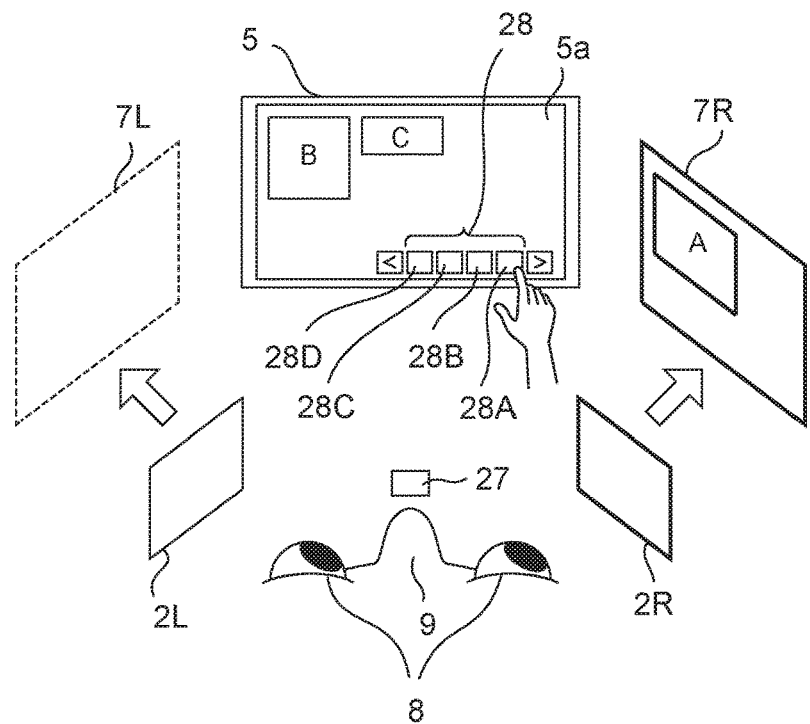
FIG. 11 is a diagram illustrating an example in which an eye direction detector is provided in a head-mounted display device, and an operator moves his/her eyes to the right to display the A-window on an enlarged image of the right side display unit.

FIG. 11 is an example in which an eye direction detector 27 is provided in the head-mounted display device 1 to detect the direction of the eyes and determine whether a selected window is to be displayed on the enlarged image 7R, the first display 5, or the enlarged image 7L so that the selected window is displayed on the display corresponding to the eye direction. The window selected in this example is an example, and other window selection method may be used. In this example, since the eye direction is on the right side, it is determined that the operator is looking at the enlarged image 7R, and the A-window selected by the window selector 28 is displayed on the enlarged image 7R. Although the eye direction is detected, the direction of the neck may be detected to select a display destination, and the display destination may be selected based on the detection results of the eye direction and the neck direction. An eye direction detection technique is disclosed in Japanese Patent Application Publication Nos. 2014-186089 and H10-334274, and the like, and a neck direction detection technique is disclosed in Japanese Patent Application Publication Nos. 2013-258614 and 2013-255102 and the like. Since these techniques are well known, the description thereof will not be provided.

Example 7

Figure 12:
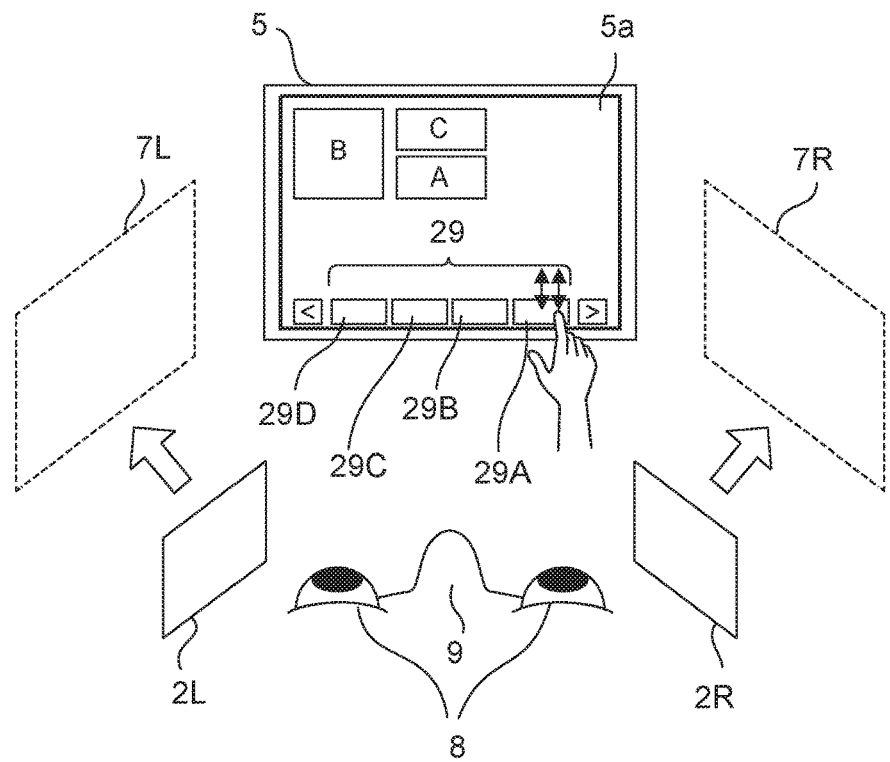
FIG. 12 is a diagram illustrating an example in which an operator touches or presses on the window select key two times to display the A-window on the first display.

FIG. 12 illustrates an example in which the first display 5 is a display 5 having a touch panel 5a attached thereto. An A-window select key 29A to a D-window select key 29D are displayed under the window of the first display 5 as a window selector 29. In this example, when the operator wants to select the A-window using the A-window select key 29A of the window selector 29, the operator touches or presses on the key two times, for example, to display the A-window on the first display 5. In this display method, the A-window is displayed on the enlarged image 7R when the operator touches or presses on the key one time, for example, and the A-window is displayed on the enlarged image 7L when the operator touches or presses on the key three times, for example. As illustrated in FIG. 7, the window select key may be provided outside the display portion of the first display 5, the window selection indicator may be provided on the display portion of the first display 5, and the A-window may be displayed on the first display when the operator presses on the A-window select key two times, for example (in this case, the first display 5 may not have the touch panel 5a attached thereto).

Example 8

Figure 13:
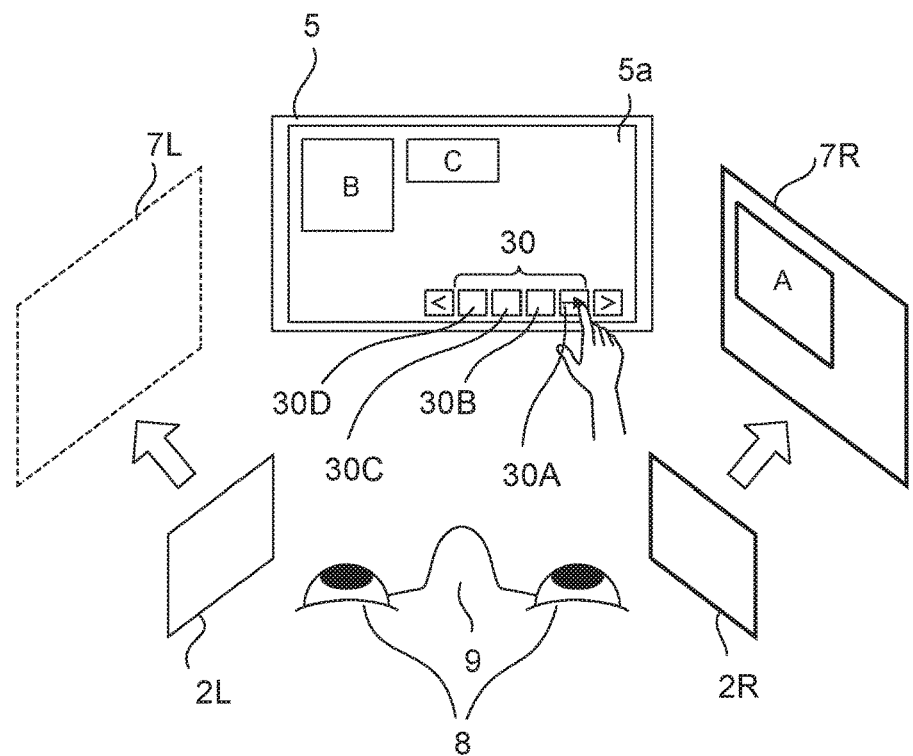
FIG. 13 is a diagram illustrating an example in which an operator touches or presses on the window select key so as to slide from left to right to display the A-window on an enlarged image of the right side display unit.

FIG. 13 illustrates an example in which the first display 5 is a display having a touch panel attached thereto. In this example, an A-window select key 30A to a D-window select key 30D are displayed as a window selector 30. In this example, when the operator wants to select the A-window using the A-window select key 30A of the window selector 30, the operator touches or presses on the key so as to slide from left to right, for example, to display the A-window on the enlarged image 7R.

In this display method, the A-window is displayed on the first display 5 when the operator touches or presses on the key so as to slid from bottom to top (or top to bottom), for example, and the A-window is displayed on the enlarged image 7L when the operator touches or presses on the key so as to slide from right to left, for example. The operator may touch or press on the key so as to draw a circle in a clockwise direction, for example, to display the A-window on the enlarged image 7R and may touch or press on the key so as to draw a circle in a counter-clockwise direction, for example, to display the A-window on the enlarged image 7L. Naturally, the operator may touch or press on the key so as to slide obliquely to select the A-window.

Example 9

Next, an example of selecting a window when each window (for example, the A-window) has a plurality of windows and an example of selecting a window to be activated among the windows displayed on the enlarged image 7R, the first display, and the enlarged image 7L will be described. The method described below is an example only, and there may naturally be a number of methods other than that described below.

Figure 14:
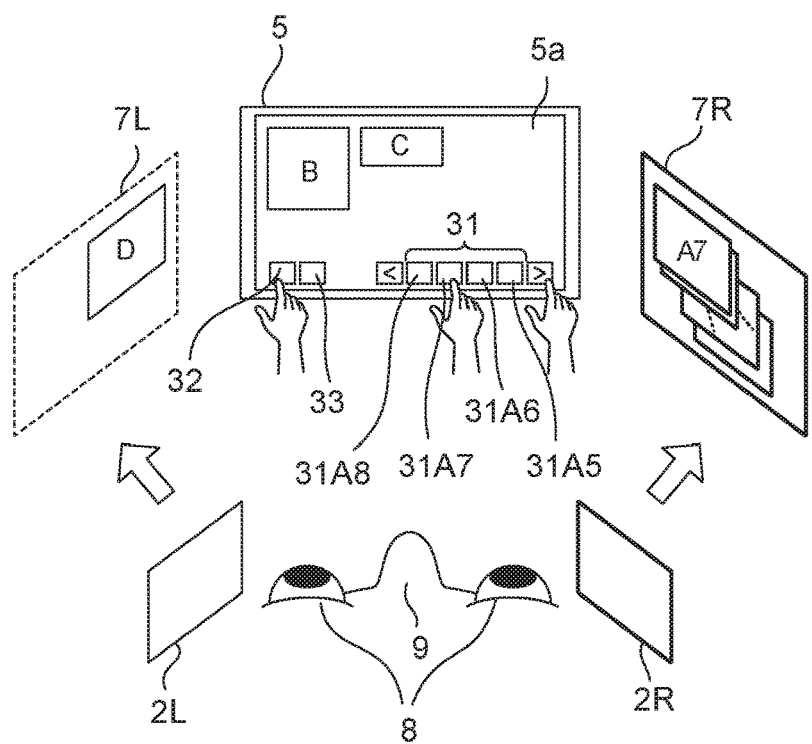
FIG. 14 is a diagram illustrating an example in which an operator activates the A-window with an immediately previous operation to select an A-window 7 inside the A-window on an enlarged image of the right side display unit.

In FIG. 14, it is assumed that an A-window is displayed on the enlarged image 7R, a B-window and a C-window are displayed on the first display 5, and a D-window is displayed on the enlarged image 7L. It is assumed that the A-window displayed on the enlarged image 7R is activated by an immediately previous operation (that is, the A-window is active as a window). It is assumed that the content of the A-window includes a first window 1 to an n-th window n. Here, n is a natural number. The window 1 to the window n of the A-window will be indicated by the A-window 1 to the A-window n.

Here, a case of selecting the A-window 7 will be described. First, an operator switches to a mode (referred to as a window n select mode) in which an operator can select one from the window 1 to the window n using a function select key (in this case, the A-window is activated and a window can be selected from the A-window 1 to the A-window n). Naturally, a function corresponding to the function select key may be provided to the hardware keyboard 6 or the MDI. In this example, since four windows can be displayed on a selector 31 of the first display 5 at a time, the A-window 1 to the A-window 4 are displayed.

Since the A-window 7 is not present in this selector 31, the operator touches or presses on ">" so that the next A-window 5 to A-window 8 are displayed on the selector 31 of the first display 5.

Figure 15:
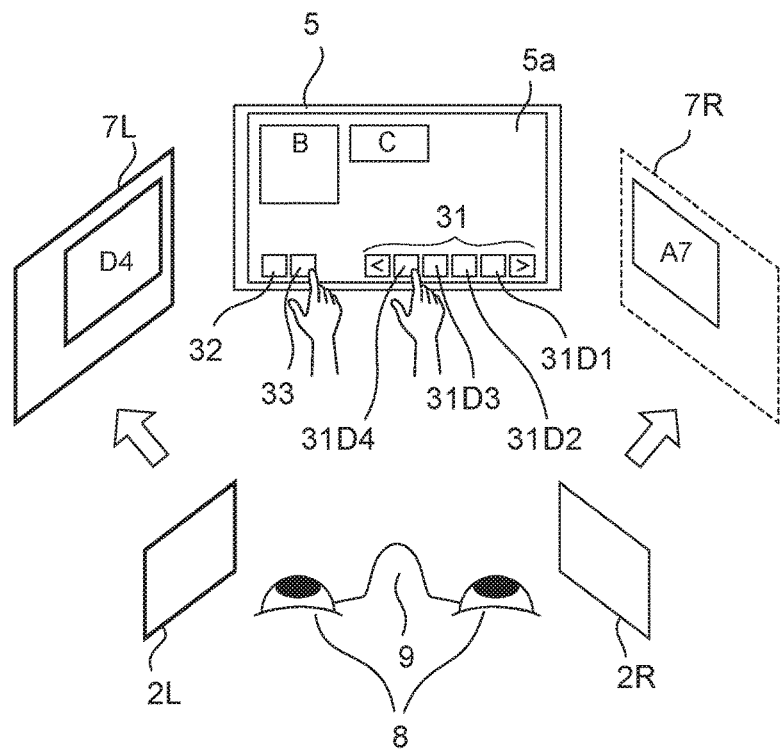
FIG. 15 is a diagram illustrating an example in which an operator touches or presses on an RCL-select key to activate a D-window and selects a D-window 4 on an enlarged image of the left side display unit.

Since an A-window-7 select key 31-7 (31A7) is present on the selector 31, the operator touches or presses on the A-window-7 select key 31-7 to display the A-window 7 on the enlarged image 7R. The operator browses the window or enters data on the window. Next, a case of activating the D-window on the enlarged image 7L will be described. FIG. 15 illustrates an example in which the operator touches or presses on an RCL select key 33 to change a window to be activated. For example, in FIG. 15, whenever the operator touches or presses on the RCL select key 33, the active window is changed in such an order of the A-window of the enlarged image 7R→the B-window of the first display→the C-window of the first display→the D-window of the enlarged image 7L. In this case, when the operator touches or presses on the RCL select key three times, the D-window of the enlarged image 7L is activated.

Here, a case of selecting a D-window 4 will be described. First, an operator switches to the window n select mode using the function select key 32. Naturally, a function corresponding to the function select key may be provided to the hardware keyboard 6 or the MDI. In this example, since four windows can be displayed on the selector 31 of the first display 5 at a time, and the D-window is active, the D-window 1 to the D-window 4 are displayed on the selector 31. The operator touches or presses on a D-window-4 select key to display the D-window 4 on the enlarged image 7L. The operator browses the window or enters data on the window.

When a large number of windows are displayed on each of the enlarged image 7R, the first display 5, and the enlarged image 7L, the active window may be switched in such an order of the enlarged image 7R→the first display 5→the enlarged image 7L by touching or pressing on the RCL select key 33, and a key for switching an active window in each window may be provided. Alternatively, arrow keys (←, ↑, ↓, and →) may be provided in the keyboard or the MDI and be operated (alternatively, the keys provided in the keyboard or the MDI may be operated).

Figure 16:
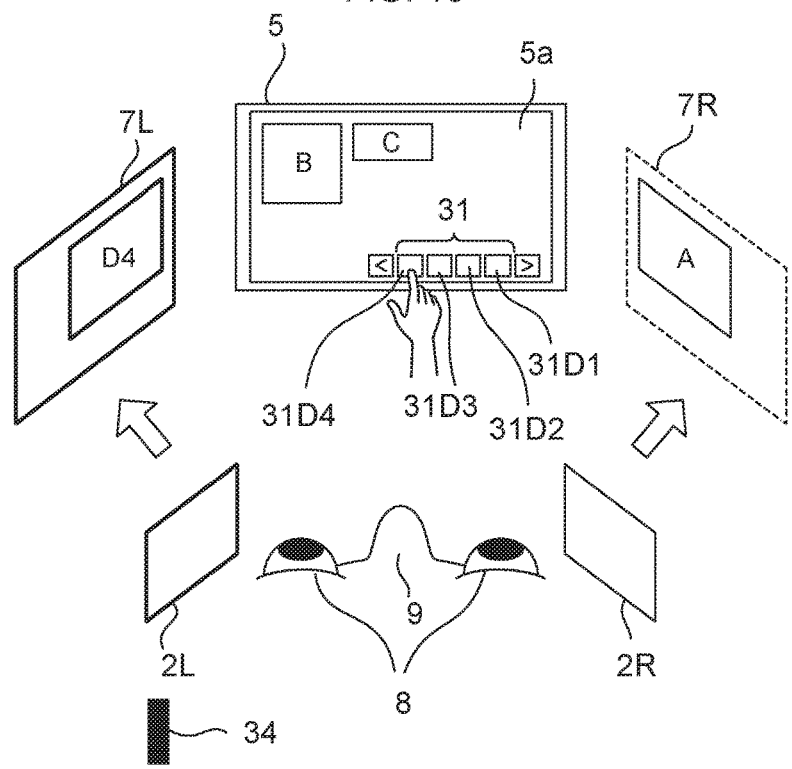
FIG. 16 is a diagram illustrating an example in which a function select key and an RCL-select key are provided in an operating unit of a head-mounted display device.

FIG. 16 illustrates an example in which a function select key and an RCL select key are provided in an operating unit 34 of the head-mounted display device 1. In this example, although the function select key and the RCL select key are provided, other keys may naturally be provided. Moreover, although the keys are provided on the left side, the keys may be provided on the right side or on both sides. In this example, the operator switches to the window n select mode using the function select key in the operating unit of the head-mounted display device 1 and touches or presses on the D-window-4 select key to display the D-window 4 on the enlarged image 7L. The operator browses the window or enters data on the window.

Figure 17:
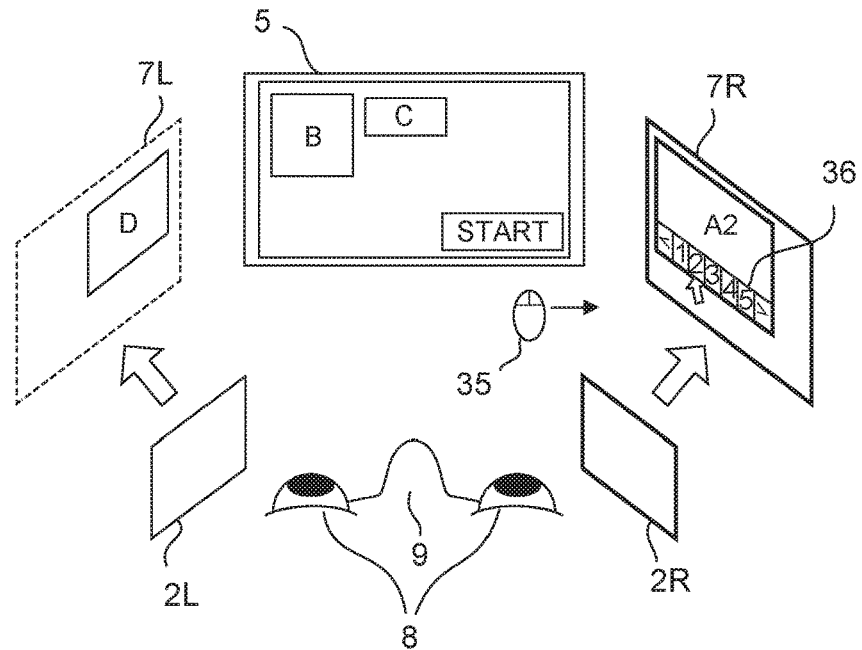
FIG. 17 is a diagram illustrating an example in which an operator selects an A-window 2 inside the A-window on enlarged image of the right side display unit using a mouse.

FIG. 17 illustrates an example of using a mouse. It is assumed that the A-window is displayed on the enlarged image 7R, the B-window and the C-window are displayed on the first display 5, and the D-window is displayed on the enlarged image 7L. It is assumed that the A-window displayed on the enlarged image 7R is activated by an immediately previous operation (that is, the A-window is active as a window). It is assumed that the content of the A-window includes window 1 to window n. The window 1 to the window n of the A-window will be indicated by the A-window 1 to the A-window n. Here, a case of selecting the A-window 2 will be described. It is assumed that "<" and ">" and five A-window switching indicators 36 are provided in a lower portion of the A-window. When the operator clicks on "2" on the window, the A-window 2 is displayed. The operator browses the window or enters data on the window. Next, a case of activating the D-window on the enlarged image 7L will be described.

Figure 18:
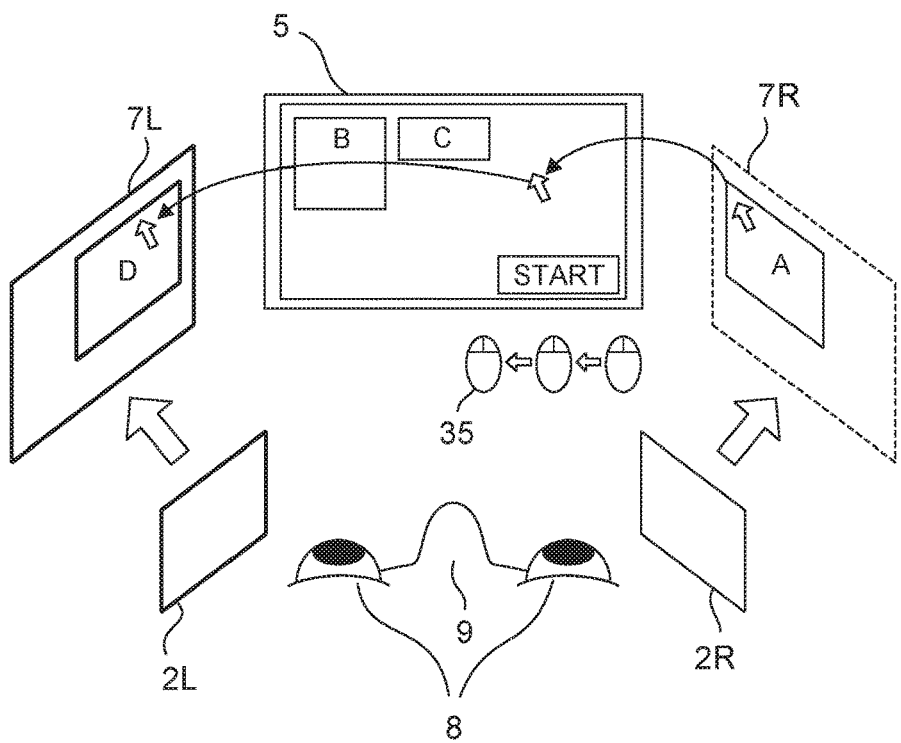
FIG. 18 is a diagram illustrating an example in which an operator moves the mouse to the left side to activate a D-window on an enlarged image of a left side display unit.

As illustrated in FIG. 18, in this example, when the operator moves a mouse 35 to the left side, the D-window on the enlarged image 7L is activated. The D-window may be activated when the operator clicks on the mouse. The operator browses the window or enters data on the window. In this example, although the mouse 35 is used, a touchpad may naturally be used. Since the functions such as movement, enlargement, reduction, and the like of windows in the screen display of the first display 5 and the head-mounted display device 1 are well known functions in a personal computer and the like, the description thereof will not be provided.

Example 10

Figure 19:
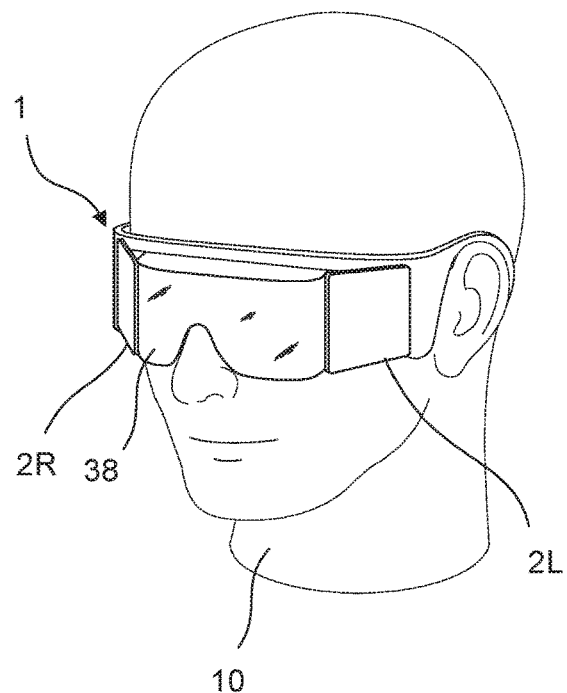
FIG. 19 is a diagram illustrating an example in which a transmissive LCD is provided in a head-mounted display device.

FIG. 19 is a diagram illustrating an example in which a transmissive LCD is provided in a head-mounted display device. The head-mounted display device 1 includes a right-eye display unit 2R, a left-eye display unit 2L, and a transmissive LCD 38 disposed between the display unit 2R and the display unit 2L.

Figure 20:
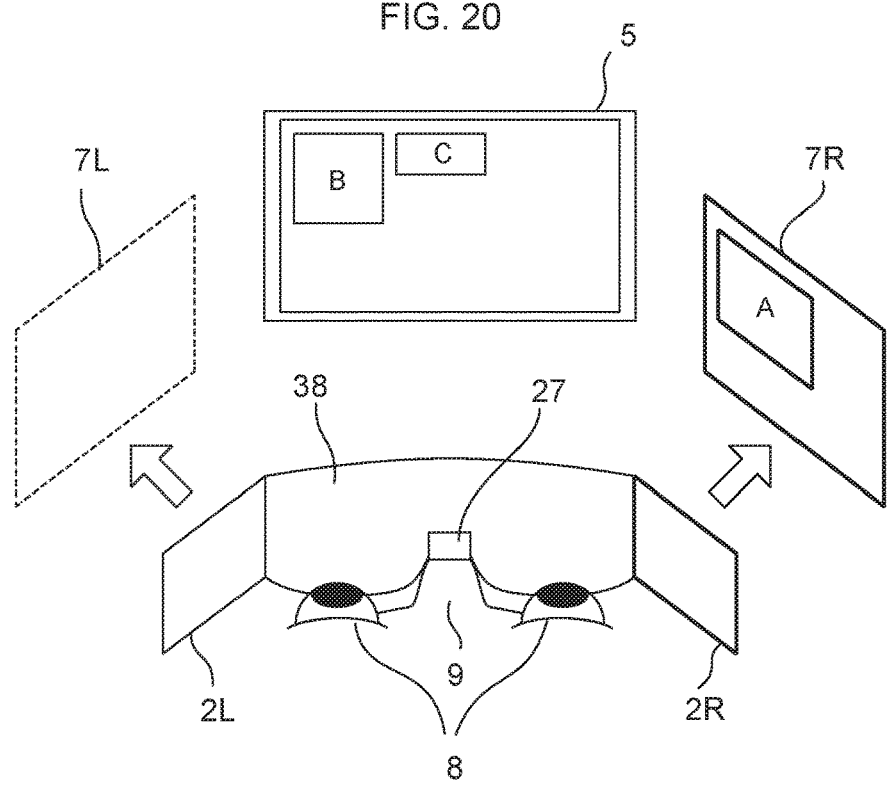
FIG. 20 is a diagram illustrating a state in which an operator can see a first display through a transmissive LCD when the operator is looking at the first display.

As illustrated in FIG. 20, the operator 10 having the head-mounted display device 1 illustrated in FIG. 19 mounted thereon can see the display window of the first display 5 through the transmissive LCD 38 when the operator 10 is looking at the first display 5.

The head-mounted display device 1 detects the direction of the eyes of the operator 10 using the eye direction detector 27 (see FIG. 11). When it is determined that the operator 10 is looking at the enlarged image 7R or the enlarged image 7L of the head-mounted display device 1, the head-mounted display device 1 performs control of applying a voltage to the transmissive LCD 38 to darken the transmissive LCD 38 as illustrated in FIG. 21. In this way, the operator 10 can easily see the enlarged image 7R or the enlarged image 7L of the head-mounted display device 1.

The device attached to the head-mounted display device 1 may not be the transmissive LCD 38. Any device can be used so long as the device is able to allow the operator to see an image displayed on the display window of the first display 5 when the operator is looking at the display window of the first display 5, and is able to darken the image displayed on the first display 5 when the operator is looking at the enlarged image 7R or the enlarged image 7L.

Example 11

FIG. 22 is a diagram illustrating an example in which a device corresponding to the first display 5 is provided in the head-mounted display device 1. In the head-mounted display device 1, a display unit 2C is provided in front of the operator 10 in a direction of looking at the display window of the first display 5, and the display unit 2R and the display unit 2L of the head-mounted display device 1 are provided on the left and right sides.

FIG. 22 illustrates an example in which, when the operator looks at the display unit 2C, the operator can see an image corresponding to an image displayed on the display window of the first display 5 provided in an electronic apparatus as an enlarged image 7C displayed by the display unit 2C. Due to this, it can be said that the head-mounted display device 1 having the display units 2R, 2C, and 2L corresponds to a display system in which the first display 5 provided in the electronic apparatus is combined with the head-mounted display device 1 having the display units 2R and 2L.

Example 12

Figure 23:
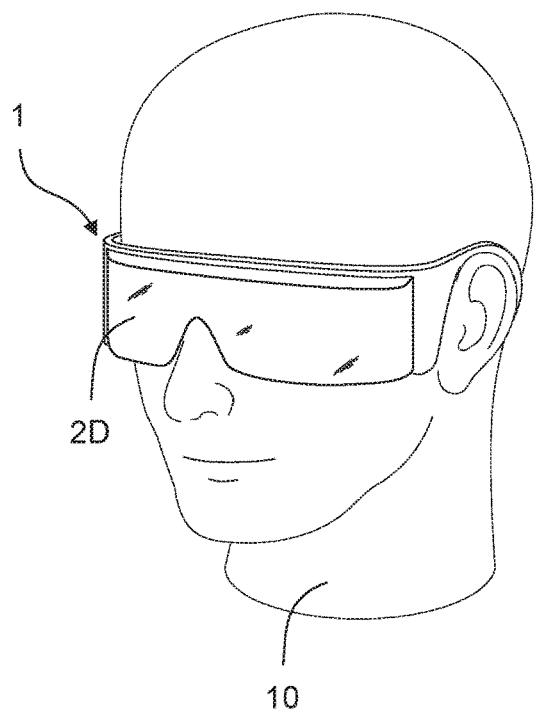
FIG. 23 is a diagram illustrating an example in which the display units R, C, and L are structurally integrated as one display unit so that an operator can see the enlarged images of display parts R, C, and L of a head-mounted display device.

In Example 11, the head-mounted display device 1 is structurally is provided with the display unit 2R, the display unit 2C, and the display unit 2L. However, in Example 12, as illustrated in FIG. 23, the display units may be structurally integrated (as a display unit 2D) so that the operator can see the enlarged image 7R, the enlarged image 7C, and the enlarged image 7L. In Example 12 illustrated in FIG. 23, although the head-mounted display device 1 is a goggles-type display, the head-mounted display device 1 may be a glasses-type display or other types of display. A goggles-type display is disclosed in Japanese Patent Application Publication No. 2013-258614, and a glasses-type display is disclosed in Japanese Patent No. 5216761. Since these displays are well known, the description thereof will not be provided. However, the inventions disclosed in Japanese Patent Application Publication No. 2013-258614 and Japanese Patent No. 5216761 do not teach any technique relating to how windows are displayed unlike the present invention. Moreover, although Japanese Patent Application Publication No. 2013-258614 discloses a display capable of displaying panorama images, this display does not display a number of windows.

Figure 24:
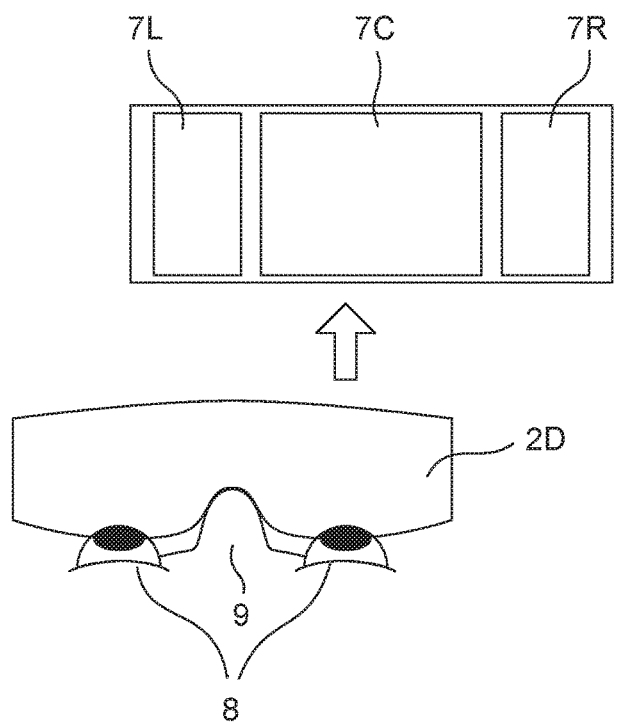
FIG. 24 is a diagram illustrating the right eye only when the display parts R, C, and L are structurally integrated and is a diagram illustrating an example in which, when the eyes of an operator are directed to the front, the enlarged images of the display parts L and R are displayed in narrow regions and the enlarged image of the display part C is displayed in a wide region.

FIG. 24 illustrates the example of the right eye only when the display units are structurally integrated (as the display unit 2D) as illustrated in FIG. 23 (the same is true for both eyes as obvious from Japanese Patent Application Publication No. 2013-258614 and Japanese Patent No. 5216761). When the operator looks at the front, the enlarged image 7C corresponding to the first display 5 is displayed in an enlarged size and the horizontal widths of the enlarged image 7R and the enlarged image 7L are narrowed (the entire images may be reduced).

Figure 25:
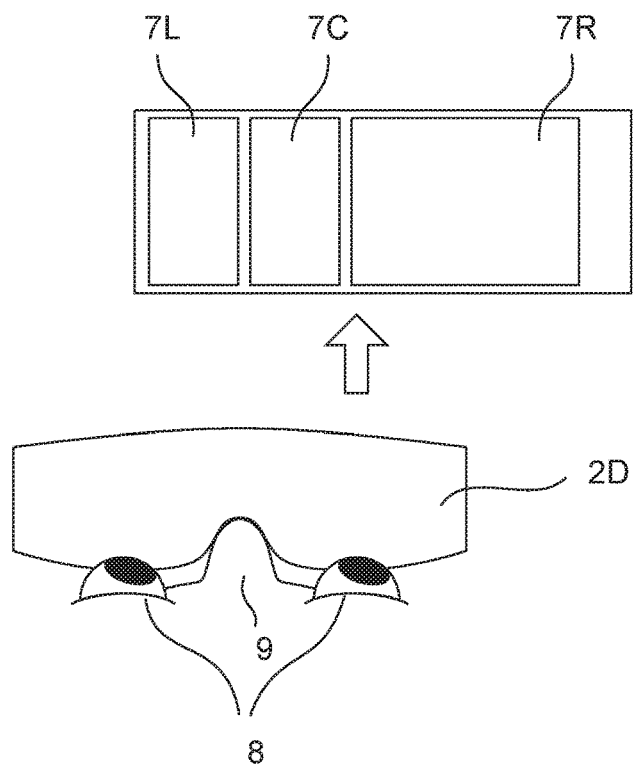
FIG. 25 is a diagram illustrating an example in which, when the eyes of an operator are directed to the right, the enlarged images of the display parts L and C are displayed in narrow regions and the enlarged image of the display part R is displayed in a wide region.

When the operator moves (rotates or turns) the direction of the eyes and the neck to the right side, an enlarged image displayed by the display unit 2D may be displayed for example as illustrated in FIG. 25 such that the horizontal widths of the enlarged image 7L and the enlarged image 7C are narrowed (the entire images may be reduced) and the enlarged image 7R are enlarged (the horizontal width thereof is increased) and shifted (moved) to the left side so as to be easily seen. In this way, it is possible to alleviate the eye fatigue (including asthenopia). When the operator moves (rotates or turns) the direction of the eyes or the neck to the left side, the enlarged image 7L is enlarged (the horizontal width thereof is increased) in this manner. Although the example of the right eye only is illustrated, the same is true for a case where the operator sees the enlarged image with his/her left eye. Whether the operator sees an image with both eyes or only one eye, the magnification ratio, the reduction ratio, how much the image is shifted (moved) and the like are arbitrary. As described in Example 6, an eye direction detection technique is disclosed in Japanese Patent Application Publication Nos. 2014-186089 and H10-334274, and the like, and a neck direction detection technique is disclosed in Japanese Patent Application Publication Nos. 2013-258614 and 2013-255102 and the like. Since these techniques are well known, the description thereof will not be provided.

Example 13

Figure 26:
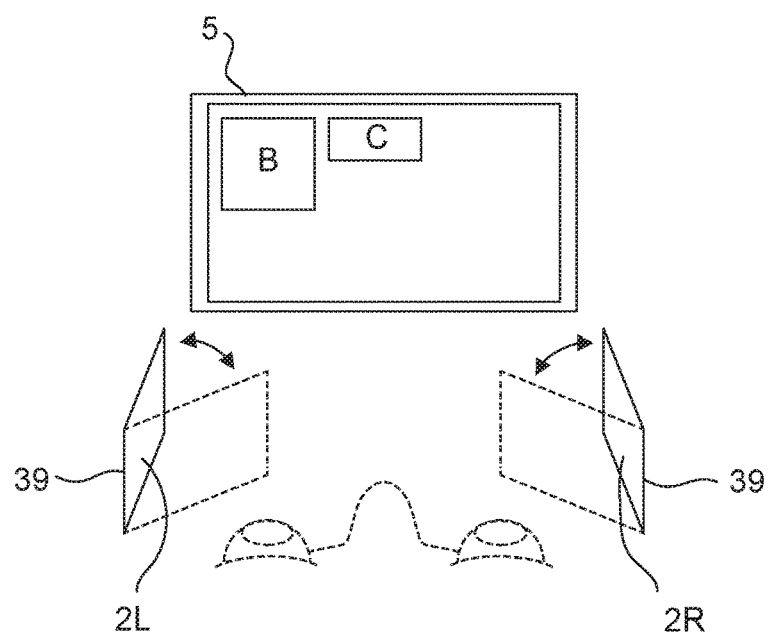
FIG. 26 is a diagram illustrating an example in which a hinge structure is incorporated in the ear sides of the right side display unit and the left side display.

FIG. 26 is a diagram illustrating an example in which the structure of a hinge 39 is incorporated in the ear sides of the display unit 2R and the display unit 2L, one or more hinges can be used. In this example, drive control is performed as follows: the structure of the hinge 39 is incorporated in the ear side of the display unit 2R of the head-mounted display device 1 so that, when the operator moves (rotates or turns) the eyes or the neck to the right side, the left side (the nose side) of the display unit 2R moves (rotates or turns), in other words, closes to a position at which the operator can easily see; and the structure of the hinge 39 is incorporated in the ear side of the display unit 2L of the head-mounted display device 1 so that, when the operator moves (rotates or turns) the eyes or the neck to the left side, the right side (the nose side) of the display unit 2L moves (rotates or turns), in other words, closes to a position at which the operator can easily see.

When the operator looks at the front, the display unit 2R and the display unit 2L are opened (at an arbitrary angle) so that the display units do not block the view of the operator when the operator looks at the front. Thus, the operator can feel a sense of openness. The hinge may be provided on the ear side of the display unit and may be provided on a portion including the display unit and a frame. Moreover, a plurality of hinges 39 may be provided on the display unit and the frame, the position of the second display may be controlled minutely rather than the opening/closing angle only.

Figure 27:
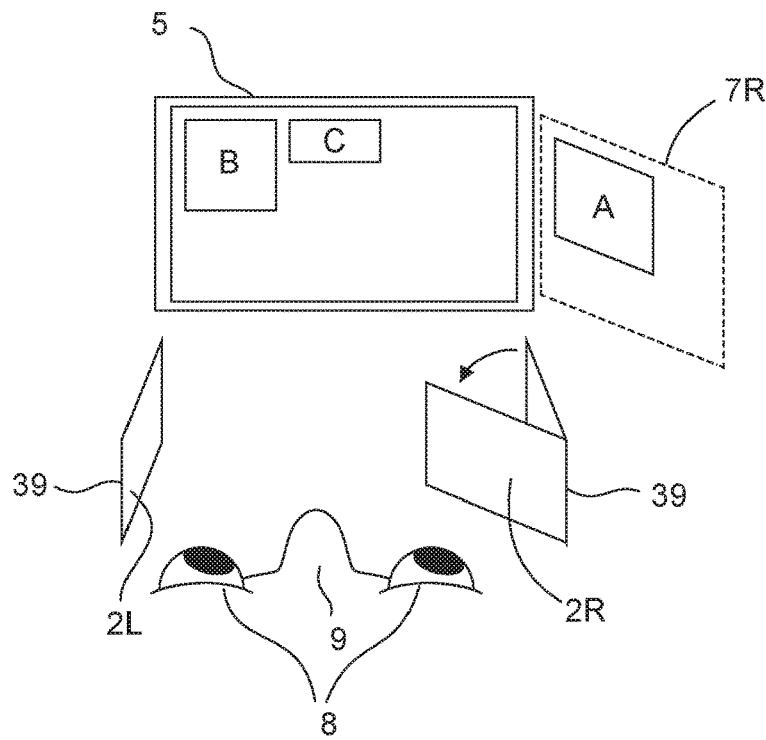
FIG. 27 is a diagram illustrating an example in which the eyes of an operator are directed to the right to close the right side display unit.

FIG. 27 illustrates an example in which the eyes are directed to the right side and the display unit 2R is closed. In this example, although the hinge 39 is provided on the left and right-ear sides, the hinge 39 may be provided on the eyebrow side, and the hinge 39 may be provided on the lower side of the eyes. Moreover, in this example, although the display unit 2R only is closed when the eyes are directed to the right side, the display unit 2L may be closed together.

Example 14

Figure 28:
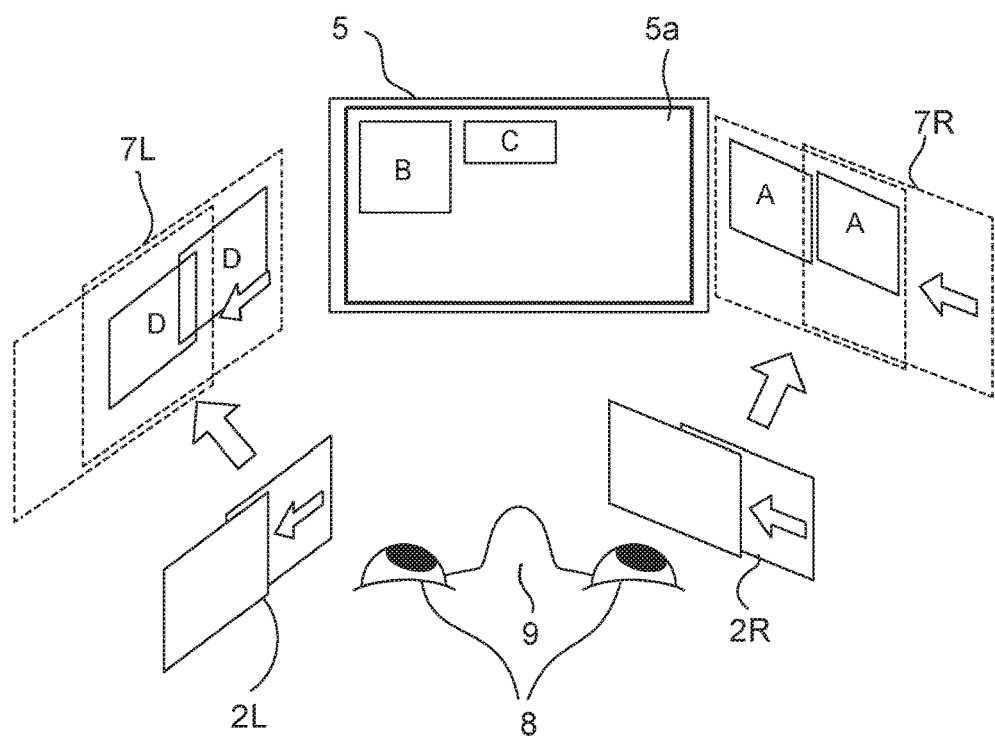
FIG. 28 is a diagram illustrating an example in which the eyes of an operator are directed to the right so that the right side display unit and the left side display unit are slid to the left side.

FIG. 28 illustrates an example in which the second display is driven to move (slid, rotated, or turned) from right to left and from left to right. In this example, when the operator moves (rotates or turns) the eyes or the neck to the right side from the front side, the second display is moved (slid, rotated, or turned) from right to left so that the operator can see the display unit 2R. Moreover, when the operator moves (rotates or turns) the eyes or the neck to the left side from the front side, the second display is moved (slid, rotated, or turned) from left to right so that the operator can see the display unit 2L. In this way, it is possible to alleviate the eye fatigue. In this example, since the eyes are directed to the right side, the display unit 2R and the display unit 2L are moved (slid, rotated, or turned) from right to left.

In this example, although the display unit 2R and the display unit 2L are moved (slid, rotated, or turned) simultaneously, the display units may be driven independently. Moreover, in this example, although the display units are moved (slid, rotated, or turned) in the left-right direction, the display units may naturally be moved (slid, rotated, or turned) in the up-down direction or obliquely. Japanese Patent Application Publication No. H10-111470 is an example of a related patent document.

FIG. 29 is a deformed schematic diagram illustrating the relation between the directions of the eyes and the neck and illustrates a direction in which the combined direction of the directions of the eyes and the neck is directed. As can be seen in FIGS. 29(d)-29(k), the neck direction (the direction of the neck) is a direction of the head in relation to the front direction when the operator turns the neck (or head) in a circumferential direction. Thus, when the neck direction is directed to the right side, the neck is directed to the right side in a state in which the body is directed to the front side. A neck angle in FIG. 29 is a rotation angle in relation to the front direction when the operator turns the neck in a circumferential direction. The eye direction is a direction in relation to the neck (=the head). Thus, when the eye direction is directed to the left side, the eyes are directed to the left side in relation to the neck. An eye angle in FIG. 29 is a rotation angle in relation to the neck (=the head) when the operator turns the eyes in a circumferential direction. The angles are expressed by absolute values in order to easily identify a direction in which a combined direction of the eye direction and the neck direction is directed. For example, when the neck is directed to the left side and the eyes are directed to the right side and the absolute values of the two angles are approximately the same, this state is expressed by (eye angle) (neck angle), and this state indicates that the operator sees the front side. When the neck is directed to the right side and the eyes are directed to the left side and the absolute value of the eye angle is larger than the absolute value of the neck angle, this state is expressed by (eye angle)>(neck angle), and this state indicates that the operator sees the enlarged image 7L. In FIG. 29(a), the neck direction is directed to the front side (the rotation angle is zero) and the eye direction is directed to the right side. Due to this, this state indicates that the operator sees the enlarged image 7R. "Look→Enlarged image 7R" in FIG. 29(a) indicates that the combined direction of the eye direction and the neck direction is directed to "look at the enlarged image 7R" (the same is true hereinbelow).

In FIG. 29(b), the eye direction and the neck direction are directed to the front side. As indicated by "Look→First display 5", this state indicates that the operator sees the first display 5. In FIG. 29(c), the eye direction is directed to the left side and the neck direction is directed to the front side (the rotation angle is zero). As indicated by "Look→Enlarged image 7L", this state indicates that the operator sees the enlarged image 7L. In FIG. 29(d), the neck direction is directed to the right side and the eye direction is directed to the left side. Since a combined direction of the eye direction and the neck direction is directed to the left side (the eye angle is sufficiently larger than the neck angle), the operator sees the enlarged image 7L. In FIG. 29(e), when the eye direction is directed to the left side ((eye angle)≅(neck angle)), the operator sees the first display 5.

In FIG. 29(f), the eye direction is straight-forward, and the operator sees the enlarged image 7R. In FIG. 29(g), the eye direction is directed to the right side, the neck direction is also directed to the right side, and the operator sees the enlarged image 7R. In FIG. 29(h), the eye direction is directed to the left side, the neck direction is directed to the left side, and the operator sees the enlarged image 7L.

In FIG. 29(i), the eye direction is straight-forward, the neck direction is directed to the left side, and the operator sees the enlarged image 7L. In FIG. 29(j), since the eye direction is directed to the right side ((eye angle)≅(neck angle)), the operator sees the first display 5. In FIG. 29(k), since the eye direction is directed to the right side (the eye angle is sufficiently larger than the neck angle), the operator sees the enlarged image 7R.

The above-described examples are examples only, and there may naturally be a number of other types of display and input (including selection and operation methods).

Although the enlarged images of the displays of the head-mounted display device 1 are disposed on the left and right sides of the first display 5, the enlarged images may be disposed on the upper and lower sides or may be disposed on a diagonal line, and the location thereof is arbitrary. In this case, by detecting the directions of the eyes and the neck, it is possible to move (slide, rotate, or turn) the display of the head-mounted display device to alleviate the eye fatigue.

Although two or three display units of the head-mounted display device 1 are mainly provided, only one display unit may be provided and four display units or more may be provided. Although only one first display (including the LCD or the like) is provided, two first displays or more may be provided.

The first display 5 is not limited to a display device of a numerical controller of a machining tool and a display device of a personal computer.

As a default option, the window before the power-OFF may be displayed after the power-ON, and several display window patterns may be created so that an operator select a pattern which is to be displayed after the power-ON.

The enlarged image of the display unit of the head-mounted display device 1 may be displayed on the retina directly. With regard to a technique of displaying information on the retina directly, a number of inventions have been filed in addition to Japanese Patent No. 5216761. Since such inventions are well known, the description thereof will not be provided.

While the embodiment of the present invention has been described, the present invention is not limited to the examples of the embodiment but may be embodied in other forms with appropriate modification.

What is claimed is:

1. A display system, comprising:
a first display provided in an electronic apparatus;
a head-mounted display device including
  a frame, and
  a second movable display movably connected to the frame;
a display destination selector configured to select, in response to an operator's selection, a display destination to determine whether a window is to be displayed on (i) the first display or (ii) the second movable display which is movable relative to the frame; and
a window selector configured to select a window to be displayed on the display selected by the display destination selector,
wherein
the head-mounted display device is provided with the second movable display at a position such that a view of the first display is not blocked when an operator wears the head-mounted display device on his/her head and sees a window of the first display, and
the window selected by the window selector is displayed on the display destination selected by the display destination selector,
the second movable display is configured to display an image, and when the operator wears the head-mounted display device, the image displayed on the second movable display is at a left or right position of, and aligned with, the first display,
the head-mounted display device includes an eye direction detector and a neck direction detector,
the display destination selector includes the eye direction detector and the neck direction detector,
the second movable display is connected to the head-mounted display device by at least one hinge and is rotatable about a connection shaft of the at least one hinge,
the eye direction detector and the neck direction detector detect an eye direction and a neck direction, respectively,
a combined direction of the eye direction and the neck direction is determined,
when the combined direction is directed to the first display, the second movable display is opened, and
when the combined direction is directed to the second movable display, the second movable display is closed.

2. The display system according to claim 1, wherein
the display destination selector is a select key, and
the display destination is selected based on a touch position or a press position of the select key.

3. The display system according to claim 1, wherein
the display destination selector is a select key, and
the display destination is selected based on the number of touches or presses on the select key.

4. The display system according to claim 1, wherein
the display destination selector is a select key, and
the display destination is selected based on a touching direction or a pressing direction of the select key.

5. The display system according to claim 1, wherein
the second movable display comprises a right-eye display unit and a left-eye display unit, the first display,
the right-eye display unit, and the left-eye display unit are arranged side by side, the right-eye display unit is disposed at an opposite side of the left-eye display unit with respect to the first display, and
the selected window is determined to be displayed on one of the first display, the right-eye display unit, and the left-eye display unit.

6. The display system according to claim 1, further comprising:
a control unit comprising the display destination selector and the window selector, and integrated in the head-mounted display device.

7. The display system according to claim 1, wherein
the second movable display comprises a right-eye display unit and a left-eye display unit,
the head-mounted display device further comprises a transmissive display located between the right-eye display unit and the left-eye display unit,
in response to determining that the operator is looking at the first display, the transmissive display is configured to permit the operator to see the first display through the transmissive display, and
in response to determining that the operator is looking at any of the right-eye display unit and the left-eye display unit, the transmissive display is configured to be darkened.

8. A display system, comprising:
a first display provided in an electronic apparatus;
a head-mounted display device including
a frame, and
a second movable display movably connected to the frame;
a display destination selector configured to select, in response to an operator's selection, a display destination to determine whether a window is to be displayed on (i) the first display or (ii) the second movable display which is movable relative to the frame; and
a window selector configured to select a window to be displayed on the display selected by the display destination selector,
wherein
the head-mounted display device is provided with the second movable display at a position such that a view of the first display is not blocked when an operator wears the head-mounted display device on his/her head and sees a window of the first display, and
the window selected by the window selector is displayed on the display destination selected by the display destination selector,
the second movable display is configured to display an image, and when the operator wears the head-mounted display device, the image displayed on the second movable display is at a left or right position of, and aligned with, the first display,
the head-mounted display device includes an eye direction detector and a neck direction detector,
the display destination selector includes the eye direction detector and the neck direction detector,
the eye direction detector and the neck direction detector detect an eye direction and a neck direction, respectively, and
the head-mounted display device is provided with a substance which transmits light when a combined direction of the eye direction and the neck direction is directed to the first display and does not transmit light when the combined direction of the eye direction and the neck direction is directed to the second movable display.

9. The display system according to claim 8, wherein
the display destination selector is a select key, and
the display destination is selected based on a touch position or a press position of the select key.

10. The display system according to claim 8, wherein
the display destination selector is a select key, and
the display destination is selected based on the number of touches or presses on the select key.

11. The display system according to claim 8, wherein
the display destination selector is a select key, and
the display destination is selected based on a touching direction or a pressing direction of the select key.

12. The display system according to claim 8, wherein
the second movable display is slidable in a left-right direction,
when a combined direction of the eye direction and the neck direction is directed to a right side, the second movable display is slid to a left side, and
when the combined direction of the eye direction and the neck direction is directed to the left side, the second movable display is slid to the right side.

13. The display system according to claim 8, wherein
the second movable display comprises a right-eye display unit and a left-eye display unit,
the first display, the right-eye display unit, and the left-eye display unit are arranged side by side, the right-eye display unit is disposed at an opposite side of the left-eye display unit with respect to the first display, and
the selected window is determined to be displayed on one of the first display, the right-eye display unit, and the left-eye display unit.

14. The display system according to claim 8, further comprising:
a control unit comprising the display destination selector and the window selector, and integrated in the head-mounted display device.

15. The display system according to claim 8, wherein
the second movable display comprises a right-eye display unit and a left-eye display unit, and
the head-mounted display device further comprises a transmissive display located between the right-eye display unit and the left-eye display unit, said transmissive display comprising said sub stance.

* * * * *